(12) United States Patent
Zahn et al.

(10) Patent No.: US 11,203,883 B2
(45) Date of Patent: Dec. 21, 2021

(54) BICYCLE STORAGE FACILITIES AND AND COMPUTER-BASED CONTROL OF ACCESS THERETO

(71) Applicant: Avenue Management Consulting, Inc., Somerville, MA (US)

(72) Inventors: Walter B. Zahn, Somerville, MA (US); Thomas Buchheister, Muehlhausen (DE)

(73) Assignee: Avenue Marketing Consulting, Inc., Somerville, MA (US)

( * ) Notice: Subject to any disclaimer, the term of this patent is extended or adjusted under 35 U.S.C. 154(b) by 61 days.

(21) Appl. No.: 16/563,870

(22) Filed: Sep. 7, 2019

(65) Prior Publication Data

US 2020/0080333 A1    Mar. 12, 2020

Related U.S. Application Data

(60) Provisional application No. 62/729,969, filed on Sep. 11, 2018.

(51) Int. Cl.
*E04H 6/42*    (2006.01)
*E04H 6/00*    (2006.01)
(Continued)

(52) U.S. Cl.
CPC .............. *E04H 6/42* (2013.01); *E04H 6/005* (2013.01); *G06Q 20/10* (2013.01); *G06Q 30/0645* (2013.01); *G07C 9/00658* (2013.01); *G07C 9/00896* (2013.01); *G07C 9/20* (2020.01); *G07C 2009/00928* (2013.01)

(58) Field of Classification Search
CPC ....... E04H 6/42; E04H 6/005; G07F 17/0057; G07F 11/64
See application file for complete search history.

(56) References Cited

U.S. PATENT DOCUMENTS 5,979,120 A    11/1999    Hollstedt
6,349,515 B1    2/2002    Naudts
(Continued)

FOREIGN PATENT DOCUMENTS

DE    9217562    7/1993
DE    29514276    1/1996
(Continued)

OTHER PUBLICATIONS

WIPO/PCT International Search Report for Appln: PCT/US19/50121, filed Sep. 7, 2019; dated Jan. 6, 2020, ISA/US (27 pp.).

*Primary Examiner* — Nabil H Syed
(74) *Attorney, Agent, or Firm* — Maura K. Moran; Cambridge Technology Law LLC

(57) ABSTRACT

A system for computer-based bicycle storage control provides reserving storage compartments of varied volumes in a bicycle storage container based on dimensional specifications of the bicycle to be stored, and the storage volume of the storage compartment. The storage container interior chamber has a turntable with a rotatable platform to align compartments with the container door, which has an adjustable door width to allow a bicycle access into and out of the compartment but limit or prevent access to compartments adjacent to the accessed compartment when the door is aligned with the selected compartment.

27 Claims, 25 Drawing Sheets

(51) Int. Cl.
  *G07C 9/00* (2020.01)
  *G06Q 30/06* (2012.01)
  *G06Q 20/10* (2012.01)
  *G07C 9/20* (2020.01)

(56) References Cited

U.S. PATENT DOCUMENTS

| | | |
|---|---|---|
| 7,481,027 B2 | 1/2009 | Blume |
| 8,437,873 B2 | 5/2013 | North |
| 10,161,178 B1 | 12/2018 | Appleby |
| 2010/0072238 A1 | 3/2010 | Pape |
| 2010/0204823 A1 | 8/2010 | North |
| 2012/0215346 A1 | 8/2012 | Gingher |
| 2013/0143536 A1 | 6/2013 | Ratti |
| 2014/0341683 A1* | 11/2014 | Lee .......... B62H 3/00 414/227 |
| 2015/0221139 A1 | 8/2015 | Bogaard |
| 2017/0069154 A1 | 3/2017 | Hilton et al. |
| 2018/0080241 A1 | 3/2018 | Greenblatt et al. |
| 2019/0382203 A1* | 12/2019 | Middelberg ........ G07F 17/0092 |
| 2021/0032890 A1* | 2/2021 | Yang ...................... E04H 6/424 |

FOREIGN PATENT DOCUMENTS

| | | |
|---|---|---|
| DE | 19805228 | 8/1999 |
| EP | 2 539 212 | 1/2013 |
| JP | 2002089069 | 3/2002 |
| JP | 2013053472 | 3/2013 |
| JP | 2014142680 | 8/2014 |
| JP | 2014211022 | 11/2014 |
| JP | 2015132153 | 7/2015 |
| JP | 2017008591 | 1/2017 |
| JP | 2017084264 | 5/2017 |
| WO | 2017023336 | 2/2017 |

\* cited by examiner

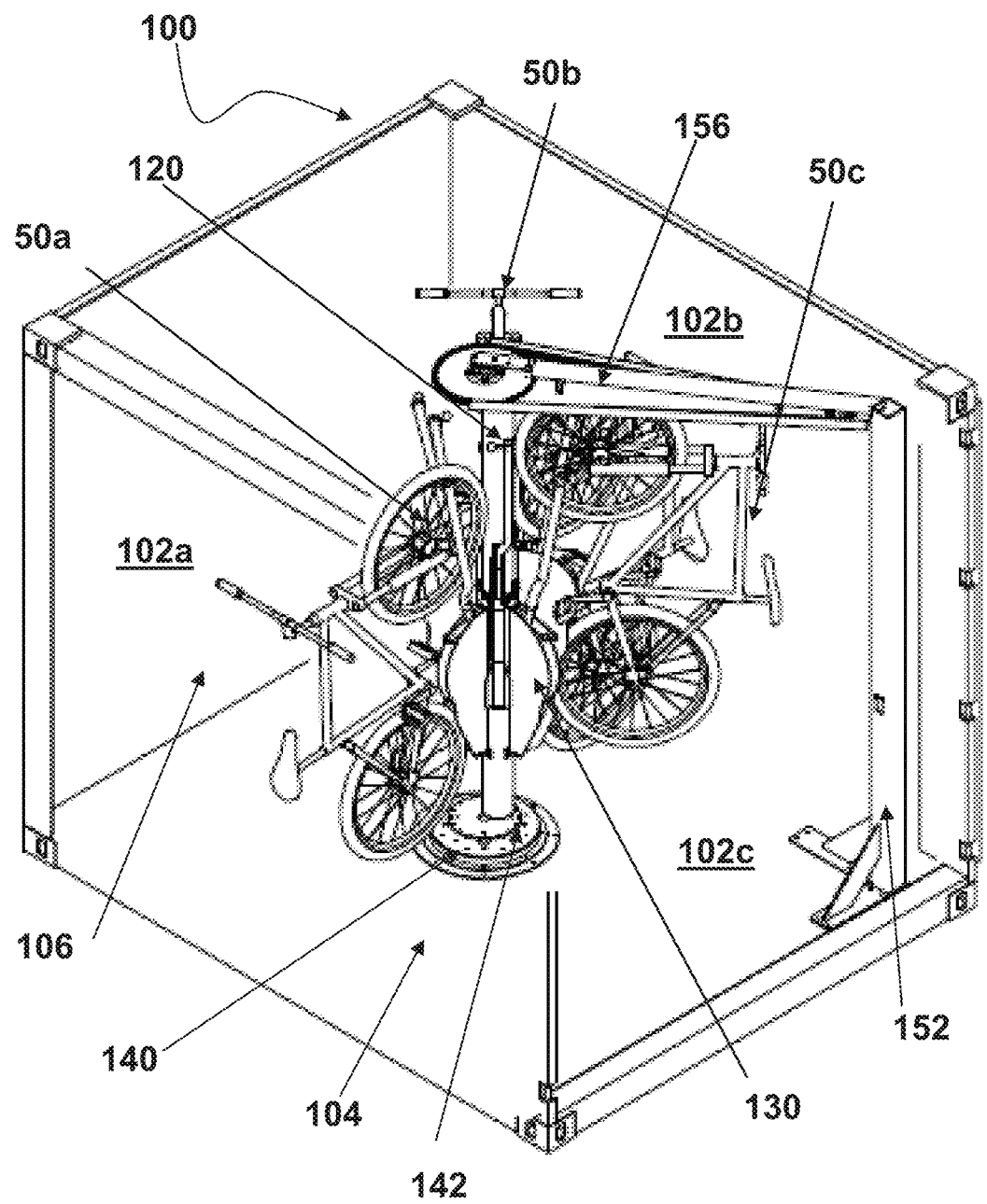

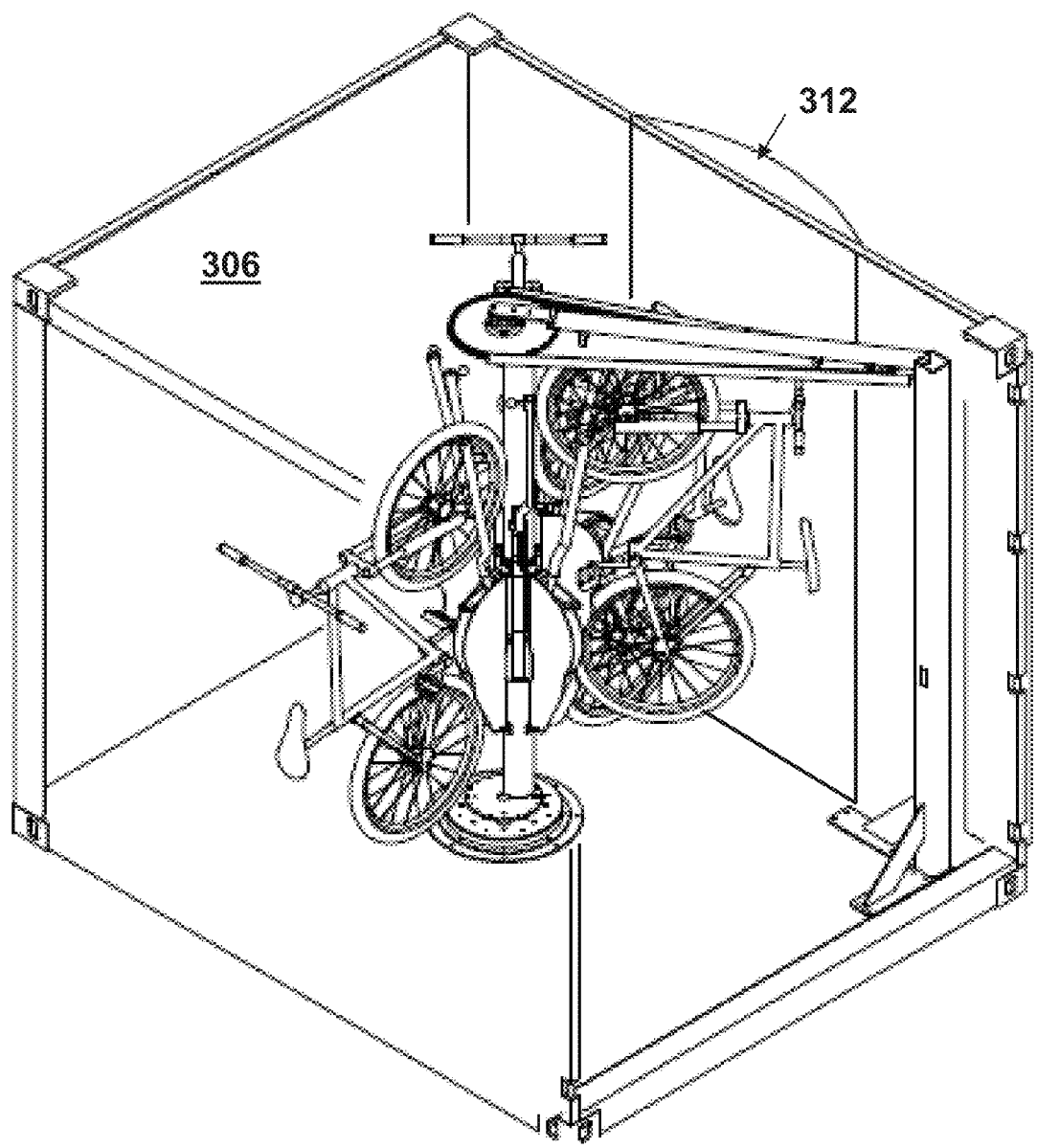

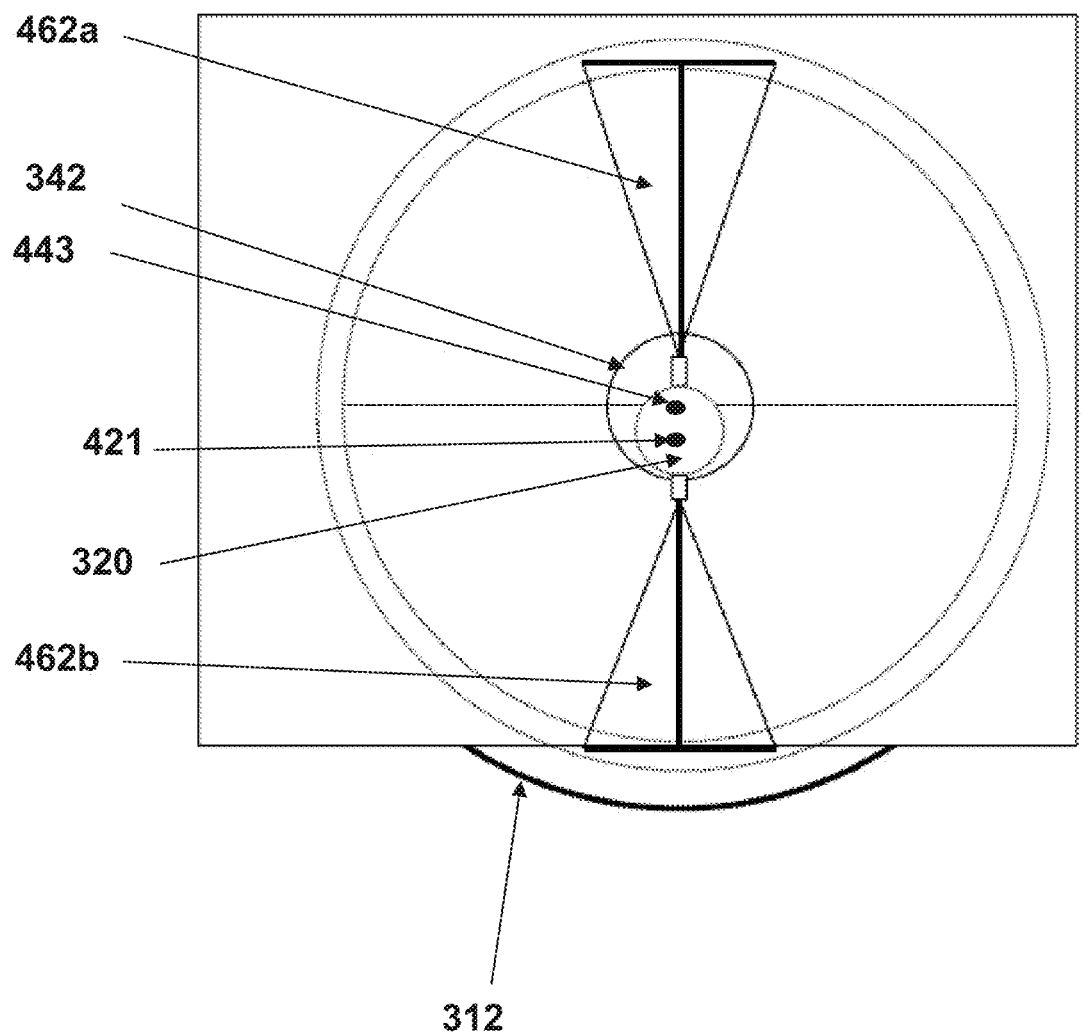

590f

590r

615w

615n

662b

662a

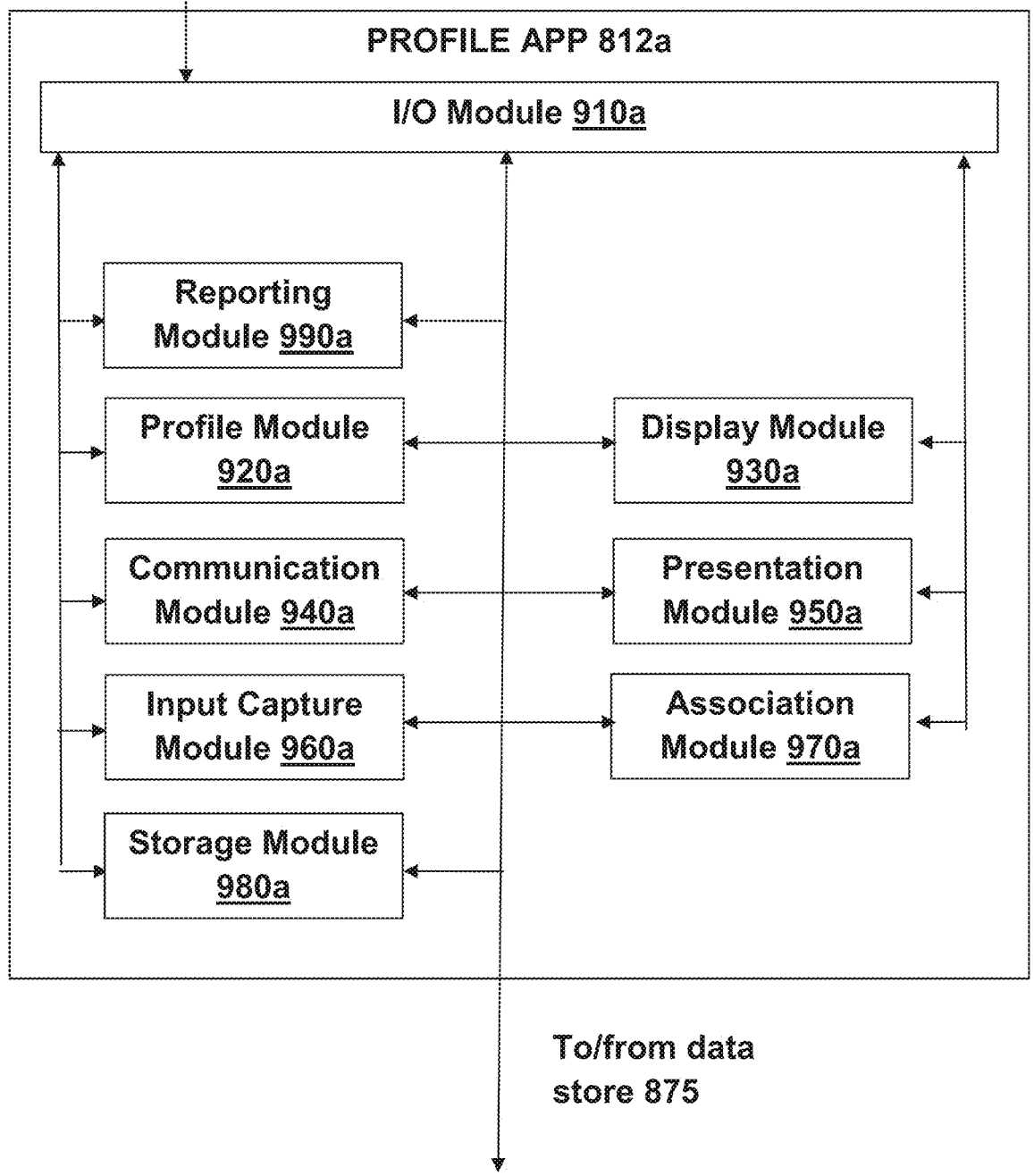

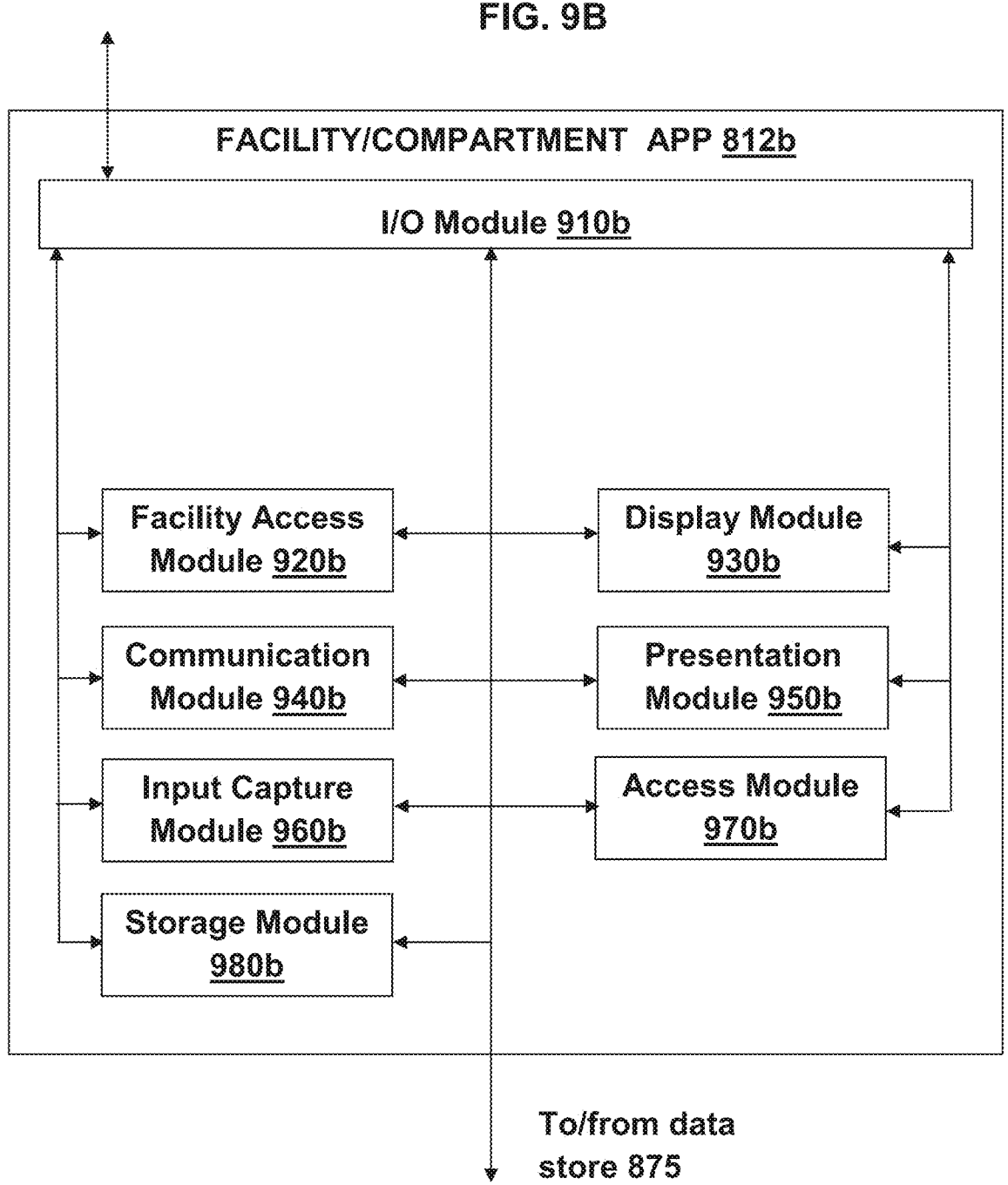

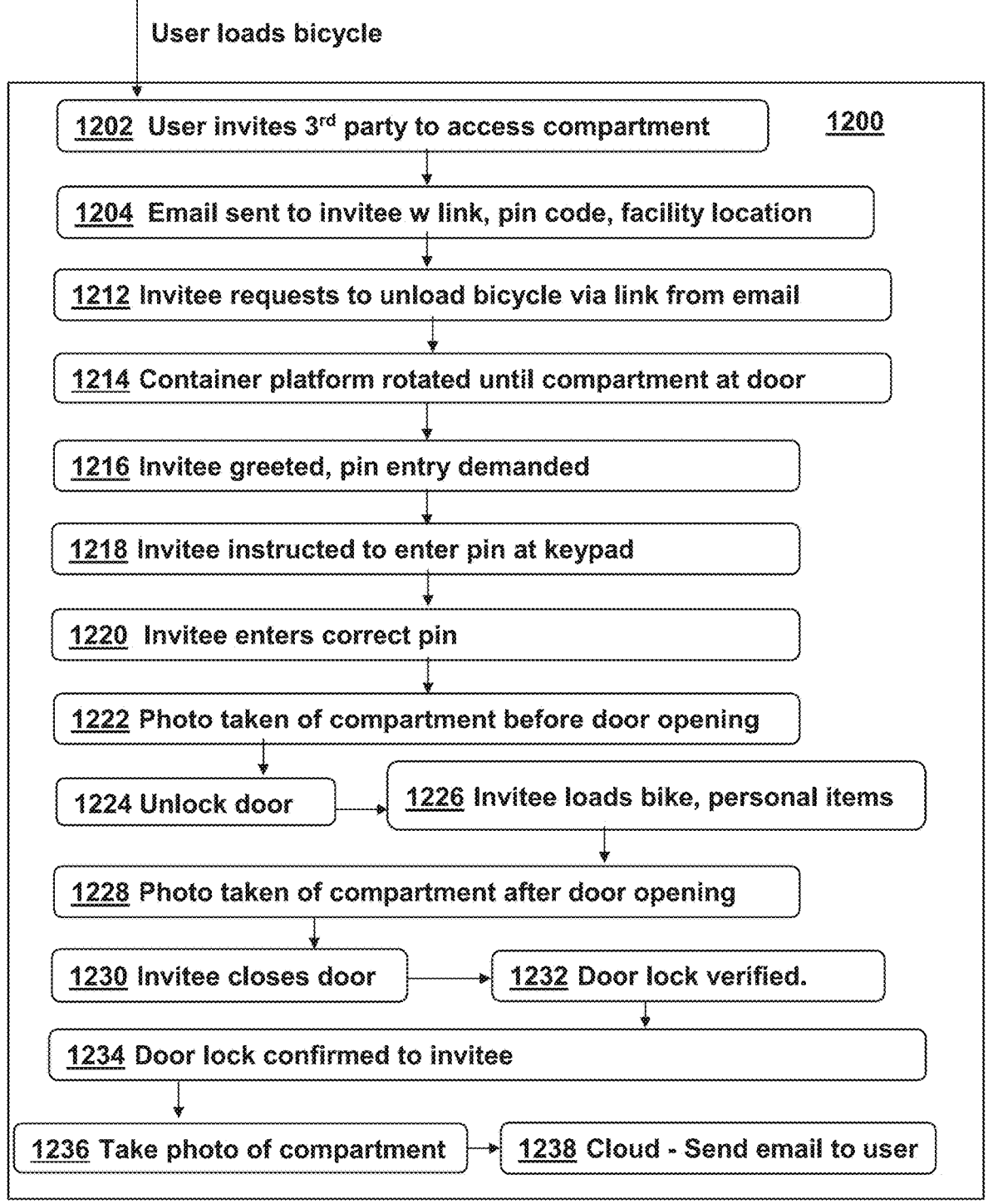

BICYCLE STORAGE FACILITIES AND AND COMPUTER-BASED CONTROL OF ACCESS THERETO

CROSS-REFERENCE TO RELATED APPLICATION

The present application claims priority to an earlier filed U.S. Provisional Patent Application No. 62/729,969, filed on Sep. 11, 2018, and entitled BICYCLE STORAGE FACILITIES AND MANAGEMENT THEREOF, the disclosure of which hereby is incorporated by reference.

FIELD

The present invention relates to the field of bicycle storage and management, and particularly to the storage of bicycles and the computer-based control of access to bicycle storage facilities.

BACKGROUND

This invention relates to methods and systems which facilitate bicycle storage and computer-based control of access to bicycle storage facilities.

A bicycle, also called a cycle or bike, is a human-powered, pedal-driven vehicle having two wheels attached to a frame, one behind the other. Bicycles are useful both for recreation (for touring, mountain biking, or physical fitness) and for transportation. Commuting by bicycle is increasingly popular.

However the bicycle is used, the end or beginning point is not always at home, so bicyclists frequently need to park their bicycles for long or short periods. Bicycles are popular targets for theft, due to their relatively low weight, portability, relative value and easy resale. Bicycle locks may deter theft, but, even when used properly, locks are often ineffective to stop bicycle theft.

Certain solutions have been suggested to make bicycle parking more secure. For example, fenced spaces have been developed as secure bicycle parking areas with various features for limiting access to the space, but they are not always theft-proof. In addition, even though bicycles are sturdy, they can become damaged if left out in the elements, and many bicycle parking areas are open air. Bicycle parking houses have been suggested to provide cover a bicycle and limit access to it. For example, U.S. Pat. No. 5,979,120, Parking House for Bicycles, discloses a circular bicycle parking and storage house in which bicycle stalls with fixed walls are positioned radially with the rear ends of the bicycles being directed toward the center axis of the house. The storage area of the house has at least one door and two floors, the inner floor being rotatable to bring a stall into alignment with a door.

U.S. Pat. No. 8,820,004, Bicycle Storage Container System, discloses a modular bicycle storage system in which a plurality of modular enclosures, each of which may be equipped with a locking door and tethered to a ground surface, may be fastened together, both vertically and horizontally if desired.

Bicycle parking houses and MODULAR bicycle enclosures can be difficult to design given the wide differences in dimensions (height/width/length) of commercially available bicycles. If the units are designed to contain all bicycles, using with the largest available dimensions, stalls or enclosures may be over-large, limiting the number of bicycles that could be stored at a selected location. In addition, occasionally larger compartments may be preferred to store multiple bicycles together.

It is desirable to have a simple, convenient system for parking and secure storage of bicycles of multiple sizes.

SUMMARY

A bicycle storage facility is disclosed in which a bicycle storage container may have a container floor, a container wall extending upwardly from the container floor, and a chamber defined by the container floor and the container wall. The chamber may have a turntable positioned on the container floor, with the turntable having a rotatable platform on a base that extends from the container floor, a mast extending upwardly from the turntable, and a plurality of bicycle storage compartments spaced radially around the mast. The bicycle storage compartments may be sized for housing a bicycle and are defined by sidewalls extending radially from the mast toward the container wall. In certain embodiments, the container may have bicycle storage compartments of differing volumes, with the volume of a first storage compartment being different than the volume of a second storage compartment. In certain embodiments, a first storage compartment may be sized to store a plurality of bicycles.

In one embodiment, a selected compartment may have a compartment opening extending across the selected compartment at or near the container wall and may further have a known compartment opening width. The container may also have a door assembly attached to the container wall that provides a door opening with an adjustable door width. The door opening may be adjustable to a door width that is based on the known compartment opening width and is selected to provide bicycle access through the adjusted door opening into and out of the selected compartment opening when the turntable is rotated to align the door with the selected compartment; and to limit or prevent access to compartments adjacent to the selected compartment when the door is aligned with the selected compartment.

In other embodiments, the compartments may be further defined to have compartment openings of varying widths extending across the compartments at or near the container wall, with a plurality of compartment opening widths associated therewith. One compartment opening width may be different from another compartment opening width. In other words, a first storage compartment may have a first compartment opening and a second storage compartment may have a second compartment opening, with the first compartment opening being wider than the second compartment opening.

Further, the door assembly may be arrangeable to adjust the door opening to a plurality of door widths, with the door widths sized to allow access through the plurality of compartment opening widths associated with the plurality of compartments.

Among the plurality of bicycle storage compartments, one bicycle storage compartment has a widest opening, another bicycle storage compartment has a narrowest opening, and the selected compartment has an opening of a known compartment opening width. The door of the door assembly further may be wide enough to accommodate the widest opening. In one embodiment, the door assembly may have a compartment shield that extends along at least a portion of a vertical side of the door and has an adjustable door width for adjustably covering at least a portion of the door opening, with the compartment shield reducing at least a portion of the door width a selected amount based on the known width of the selected compartment opening.

In another embodiment, the door of the assembly may be a sliding door that slides to change the door width from a widest door width to narrower door widths that accommodate the variety of compartment opening widths associated with the openings of the plurality of bicycle storage compartments while limiting or preventing access to other compartments, with the sliding door adjusting the door width a selected amount based on the known compartment opening width of the selected compartment.

In still further embodiments, the compartment openings of the bicycle storage compartments extend across the compartments at or near the container wall, and the first storage compartment has a first compartment opening that is different in compartment opening width from the second compartment opening of the second storage compartment, and the selected compartment has a compartment opening of a known opening width. Further, the door width is sized to accommodate a plurality of compartment opening widths, with the compartment shield being adjustable to change the door width to accommodate the known opening width of the selected compartment.

In a further embodiment, the mast may be offset from the center of the turntable, thereby providing the chamber with compartments of varied lengths of sidewalls from mast to ends of the sidewalls near to the container wall. In some embodiments, the slidable door is arranged to slide horizontally across the door width of the door. In other embodiments, the slidable door is arranged to slide vertically along the height of the opening of the compartment.

In further embodiments, the first compartment has hanging components for rear wheel up storage of the bicycle, and the second compartment has hanging components for front wheel up storage of the bicycle. In further embodiments, the selected compartment has at least one non-bicycle item storage holder for storing personal items of the bicyclist; and, in other embodiments, the selected compartment has a bicycle lift.

In further embodiments, the selected compartment is sized to support rear wheel up storage of the bicycle; in other embodiments, the selected compartment is sized to support front wheel up storage of the bicycle. In further embodiments, the selected compartment is sized to store a plurality of bicycles. In other embodiments, a first storage compartment is sized to store a first bicycle of a first size, a second storage compartment is sized to store a second bicycle of a second size; and the first size is different than the second size. In other embodiments, the first storage compartment is sized to store a first number of bicycles, the second storage compartment is sized to store a second number of bicycles, with the first number being different from the second number. In other embodiments, the container wall may have a top and a bottom, with the bottom at or near the container floor, and a container roof may extend across the container at or near the top of the container wall.

In other embodiments, a computer system may be provided with a processor, a memory; and a non-transitory computer-readable medium encoding instructions for computer-based booking of the compartments and for execution by the processor. The instructions may be programmed to cause the processor to receive, into the memory, a request for access to bicycle storage; and in response to receiving the request to access the bicycle storage, provide access to the selected compartment based on dimensional specifications of the bicycle and the selected volume of the selected compartment.

In certain embodiments, the door may be planar. In other embodiments, the door may be curved convexly relative to a center of the container and extending beyond the container wall. In other embodiments, the selected compartment and another selected compartment share a common sidewall.

A variety of embodiments of container geometries are contemplated. In certain embodiments, the container wall may be formed with a first number of sides; the chamber may have a second number of compartments; and the first number of container sides is different from the second number of compartments. In a further embodiment, the first number of container sides is greater than the second number of compartments.

In other embodiments, the container floor has a width and a length, and the container has a compartment space encompassing the plurality of bicycle storage compartments. The compartment space has a boundary with a cross-section that is co-planar with the container floor, and the compartment space cross-section has a diameter that is longer than the container width. The door in the container wall is sized and curved convexly relative to the center of the container from the container wall to accommodate the compartment space. In a further embodiment, the container is a recycled standard cargo container, which, typically being longer than it is wide, has a door in the container wall that is sized and curved convexly from the container wall to accommodate the narrower container width.

A method is also disclosed for accessing a bicycle storage compartment in a storage container, with the storage compartment having a known compartment opening width and with the storage container having a door assembly attached to the container wall that provides a door opening with an adjustable door width. In the method, a plurality of bicycle storage compartments may be spaced in a container having a container wall and a container floor, with the bicycle storage compartments sized for housing a bicycle and spaced radially on a platform around a mast extending upwardly from a turntable positioned on the container floor. In one embodiment of the method, a first storage compartment may be sized to be different in volume than a second storage compartment.

In the disclosed method, a selected compartment may be separated from adjacent bicycle storage compartments with sidewalls extending radially from the mast toward a container wall; and a computer-based rotation may be performed on the platform to align the selected compartment with a door assembly attached to the container wall. Computer-based selection of a door width may be performed to select a door width of the door opening based on the known compartment opening width of the selected compartment, with the selected door width sized to accommodate the opening of the selected compartment while limiting or preventing access to compartments adjacent to the selected compartment. Computer-based opening of the door to the selected door width may be performed to allow bicycle access into and out of the selected compartment through the door opening and the compartment opening.

In further embodiments of the method, the mast is further offset from the center of the turntable, thereby providing the chamber with compartments of varied lengths of sidewalls from mast to ends of compartment. In further embodiments, the container floor has a width and a length, and a compartment space encompasses the plurality of bicycle storage compartments, with the compartment space having a boundary with a cross-section that is co-planar with the container floor, and with a diameter of the compartment space boundary being longer than the container width. The method further comprises sizing the door in the container wall and curving the door convexly from the container wall to encompass the compartment space.

A system is also disclosed for executing the methods described above for accessing a bicycle storage compartment in a storage container, with the storage compartment having a known compartment opening width and with the storage container having a door assembly attached to the container wall that provides a door opening with an adjustable door width. The bicycle storage container for the system may have a container floor; a container wall extending upwardly from the container floor; and a chamber defined by the container floor and the container wall. The chamber may have a turntable positioned on the container floor, the turntable with a rotatable platform on a base that extends from the container floor; a mast extending upwardly from the turntable, and a plurality of bicycle storage compartments spaced radially around the mast. The bicycle storage compartments may be sized for housing a bicycle and may be defined by sidewalls extending radially from the mast toward the container wall (in certain embodiments, a first storage compartment is different in volume than a second storage compartment).

The container may also have a door assembly attached to the container wall that provides a door having a door opening with an adjustable door width; and a computer system with a processor; a memory containing records associated with the plurality of bicycle storage compartments; and a non-transitory computer-readable medium encoding instructions for computer-based accessing of bicycle storage compartments and for execution by the processor.

The instructions may be programmed to cause the processor to receive, into the memory, a request for storage access for a first bicycle, and in response to receiving the storage access request, provide access into and out of a selected compartment. The instructions may be programmed to provide the access through computer-based rotation of the platform to align the selected compartment with the door assembly in the container wall; and through computer-based selection of a width for the adjustable door width (with the selected width based on the selected compartment and sized to accommodate accessing the selected compartment while limiting or preventing access to compartments adjacent to the selected compartment). The instructions also may be programmed to provide the access through computer-based opening of said door to the selected door width to allow bicycle access into and out of the selected compartment.

In further embodiments, the selected compartment may have a selected volume; and a record associated with the selected storage compartment may store volume data associated with the selected compartment. Further, the instructions may include instructions for computer-based access to the storage compartments, in which the processor is programmed, in response to receiving the request to access the bicycle storage, to select the selected compartment based on dimensional specifications of the bicycle, and the selected volume of the selected compartment.

In still further embodiments, the selected storage compartment may be defined by an opening width that comprises a width of an opening that extends across the selected storage compartment at the ends of the sidewalls near to the container wall; and a record associated with the selected storage compartment may store the opening width data associated with the bicycle storage compartment.

Further, among the plurality of bicycle storage compartments, a bicycle storage compartment may have a widest opening and another bicycle storage compartment may have a narrowest opening; while the computer-based opening of said door the selected door width includes computer-based opening of the door opening to the selected opening width of the selected storage compartment, with the adjustable door opening width being at least sufficiently wide to accommodate the widest opening and at least sufficiently narrow to accommodate the narrowest opening.

In still further embodiments, the door assembly further has a compartment shield that extends along at least a portion of a vertical side of the door and has an adjustable shield width for adjustably covering at least a portion of the selected door width, with the compartment shield reducing at least a portion of the door opening a selected amount based on the known width of the selected compartment.

In still further embodiments, the door may be a sliding door that is slidable to change the door width from a widest door width through a plurality of door widths, with the door widths accommodating the compartment openings widths of the set of bicycle storage compartments while limiting or preventing access to other compartments.

A method is also disclosed for computer-based accessing of a bicycle storage compartment based on dimensions of a bicycle and a storage compartment. In the method, a request for access to one of a plurality of bicycle storage compartments for storage of a first bicycle may be received into a computer system, and, in response to receiving the storage access request, computer-based accessing, in a memory of a computer, of compartment records may be performed for volume data associated with the plurality of bicycle storage compartments, with the record of the first storage compartment including data associated with volume of the first storage compartment, with the first storage compartment being different in volume than a second storage compartment.

In addition, computer-based comparing may be performed of the compartment records with the request for access, and computer-based providing of access to the first storage compartment may be performed based on dimensional specifications of the first bicycle, and the stored volume of the first storage compartment.

In further embodiments of the method, the dimensional specifications of a first bicycle may be at least one of the following specifications:
  a length of the first bicycle, as measured from front to rear of the first bicycle;
  a seat height of the first bicycle, as measured from the ground to a top of the first bicycle's seat (with the top of the seat being the highest vertical point of the seat relative to the ground when the first bicycle is standing upright on the ground with the wheels of the first bicycle in contact with the ground);
  a handlebar height of the first bicycle, as measured from ground to a top of the first bicycle's handlebars (with the top of the handlebars being the furthest vertical point of the handlebars of the first bicycle relative to the ground when the first bicycle is standing upright on the ground with the wheels of the first bicycle in contact with the ground); and
  a handlebar width of the bicycle comprising a length across the first bicycle's handlebars, measured from a furthest right end of the right handlebar to a furthest left end of the left handlebar.

In further embodiments, the memory may contain records associated with a plurality of bicycles, with the bicycle records storing the dimensional specifications of the bicycles, including dimensional specifications for the first bicycle. When the request identifies the first bicycle; the instructions may be further programmed to cause the processor to provide access to the first storage compartment based on the stored dimensional specifications of the identified first bicycle as compared to the stored volume of the first storage compartment.

In another embodiment, when the request identifies dimensional specifications of the first bicycle, the instructions may be further programmed to cause the processor to provide access to the first storage compartment based on the identified dimensional specifications of the first bicycle as compared to the stored volume of the first storage compartment.

In another embodiment, the memory may further contain product data records (with product data such as a brand name and/or a model identifier) for multiple bicycles, with a product data record storing dimensional specifications of a bicycle associated with selected product data. The request may identify product data (such as a brand name and/or a model identifier) associated with the first bicycle; and the instructions may be further programmed to cause the processor to provide access to the first storage compartment based on the stored dimensional specification associated with the identified product data of the first bicycle as compared to the stored volume of the first storage compartment.

In another embodiment of the system, the compartment record may store access availability of the first storage compartment; and the instructions may be further programmed to cause the processor to provide access to the first storage compartment based on the access availability of the first storage compartment In yet another embodiment, the instructions may be further programmed to cause the processor, in response to receiving the storage access request, to present a list of the bicycle storage compartments that would fulfill the storage access request to a user for selection of a desired storage compartment; and, in response to a selection by the user, provide access to the desired storage compartment.

In yet another embodiment, the request may identify a desired storage compartment; and the instructions may be further programmed to cause the processor, in response to receiving the storage access request, to provide access to the desired storage compartment when the desired storage compartment fulfills the storage access request.

A system is disclosed for executing the methods described above for computer-based accessing of a bicycle storage compartment based on dimensions of bicycle and storage compartment. The system may have a processor and a memory containing records associated with a plurality of bicycle storage compartments. The compartment records may be arranged to store volume data associated with the bicycle storage compartments, with a record for a first storage compartment including data associated with volume of the first storage compartment, the first storage compartment being different in volume than a second storage compartment.

The system may also have a non-transitory computer-readable medium encoding instructions for computer-based bicycle storage compartment access and for execution by the processor, with the instructions programmed to cause the processor to receive, into the computer, a request for storage access for a first bicycle, and, in response to receiving the storage access request, provide access to the first storage compartment based on dimensional specifications of the first bicycle, and the stored volume of the first storage compartment.

In another embodiment, the bicycle storage compartments may occupy a selected storage container, and the instructions may be programmed to cause the processor to provide access to the selected storage container.

In another embodiment, the system may have multiple storage containers, with the first storage compartment occupying at least a portion of a first storage container and the storage access request identifying a desired storage container. The instructions may be further programmed to cause the processor, in response to receiving the request, to provide access to a bicycle storage compartment in the desired storage container that would fulfill the storage access request.

In another embodiment having a plurality of storage containers, one or more storage compartments may occupy a single storage container and the compartment records may further identify the location of the storage containers associated with the bicycle storage compartments and store data associated with the location of the storage containers, with the record for the first storage compartment identifying a first storage container in which the first storage compartment is located and a location of the first storage container itself. The instructions may be further programmed to cause the processor to identify the first storage compartment that fulfills the storage access request, the first storage container in which such first storage compartment is located, and the location of such first storage container itself.

In another embodiment, the system may have a plurality of geographic areas in which one or more storage containers are located; and the request for storage access for a first bicycle may include a desired geographic area. The instructions may be further programmed to cause the processor to provide access to a bicycle storage compartment that would fulfill the storage access request in a storage compartment in the desired geographic area. In a further embodiment, the desired geographical area may contain more than one bicycle container. The instructions may be further programmed to cause the processor, in response to receiving the storage access request, to present a list of bicycle containers occupied by compartments that would fulfill the storage access request to the user for selection of a desired bicycle container.

In another embodiment, the system may have communication components for transmitting the request for storage access, for identifying the first storage compartment, and for allowing the user to access the compartment. In a further embodiment, the communication components may include a radio-frequency identification (RFID) card. In a still further embodiment, the RFID card may be arranged to identify a selected compartment assigned to a user.

In another embodiment, the system may have control components for providing access to the first storage compartment. In further embodiments, the system may have control components for providing access to other storage compartments in the plurality of bicycle storage compartments, with the control components operatively connected to one another via a system of interconnected computer networks. In still further embodiments, the system of interconnected computer networks may be a wired communication system; in another embodiment, the system of interconnected computer networks may be a wireless communication system.

The disclosed apparatuses, methods and systems are very adaptable and may be used to simply, conveniently, and securely storage and control the storage of many bicycles in a relatively small footprint.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment(s) of the invention and together with the description, serve to explain the principles of the invention.

BRIEF DESCRIPTION OF THE DRAWINGS

FIG. 1B is a breakaway perspective view of the exterior of the bicycle storage container 100 of FIG. 1A, with a portion of the exterior wall removed;

FIG. 1G-I is a detail side view of the drive unit 150 of the bicycle storage container 100 and FIG. 1G-2 is another detail side view of the drive unit 150 of the bicycle storage container 100;

FIG. 2 is a schematic view of the eccentric rotating turntable 140 of FIG. 1C, showing an out-of-center mast 120 disposed on the turntable 140;

FIG. 3B is a breakaway perspective view of the exterior of the bicycle storage container 300 of FIG. 3A, with a portion of the exterior wall removed;

FIG. 4 is a schematic view of the eccentric rotating turntable 340 of FIG. 3C, showing the out-of-center mast 320 disposed on the turntable 340;

FIG. 9A is a block diagram of a profile application for use in establishing and updating user profile records;

FIG. 9B is a block diagram of a facility/compartment access control application for use in controlling access to facilities and their associated compartments;

FIG. 12 is a flow chart showing a workflow 1200 for allowing third party access to a compartment.

DETAILED DESCRIPTION

Figure 1A:
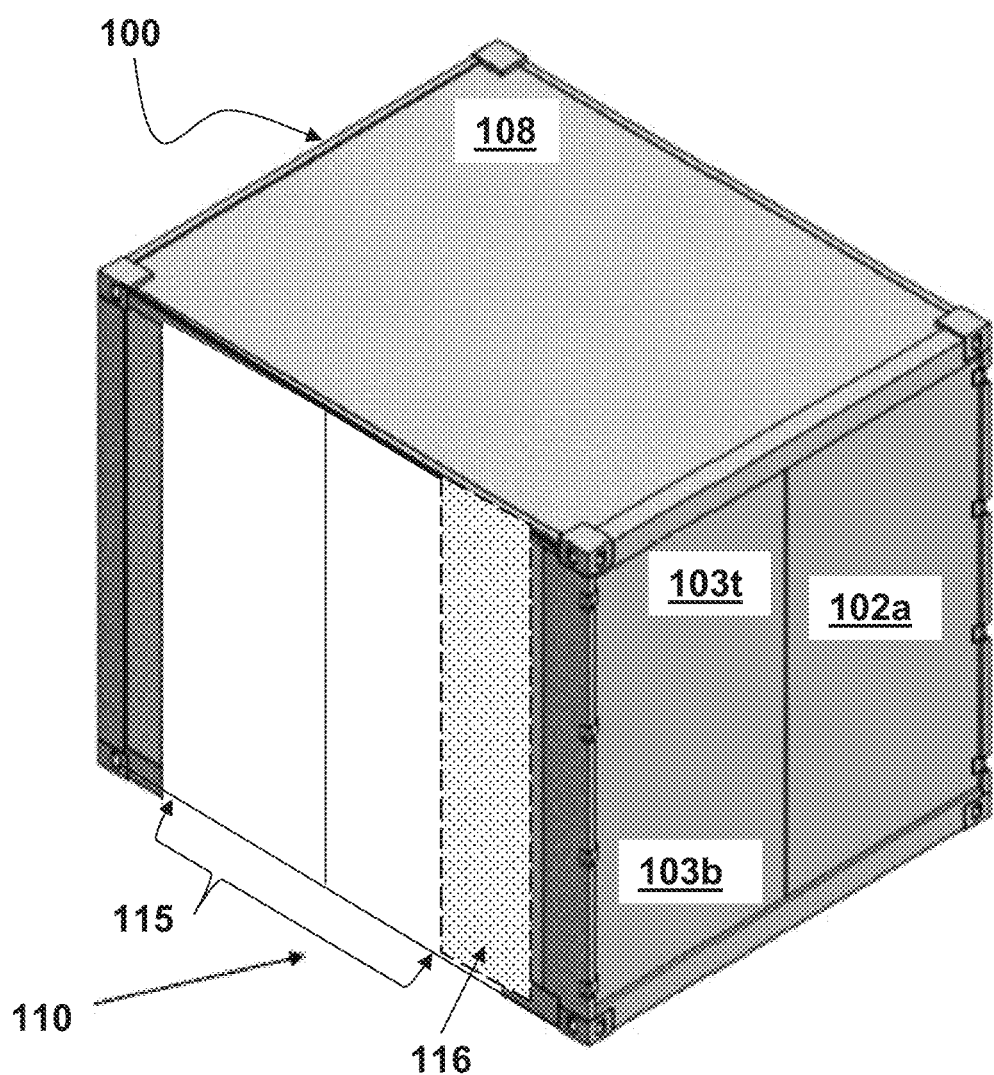
FIG. 1A is a perspective view of the exterior of an exemplary bicycle storage container 100 with a closed flat door 112.

Reference will now be made in detail to the present exemplary embodiments, examples of which are illustrated in the accompanying drawings. Wherever possible, the same reference numbers will be used throughout the drawings to refer to the same or like parts.

Bicycle Storage Compartments in Bicycle Storage Facilities

A bicycle storage container 100, also known as a storage container, container, container, storage house, storage condo, or bicycle storage facility, which may contain bicycle storage compartments that are available for rent for a fee based on usage, according to the present invention will now be described in detail with reference to FIGS. 1A to 1F-1 and 1F-2 and FIG. 2 of the accompanying drawings. The container 100 may be used to temporarily, securely, and releasably park and store bicycles, such as bicycles 50a, 50b, and 50c. In certain embodiments, the container may be a single standalone building such as container 100, or it may be a part of a system of multiple facilities that are set in a single location or in a myriad of locations such as throughout a city or in the suburbs, in residential, office and recreational areas, and at train/subway stations near to such locations. Apartment complexes, office parks, and tourist areas may have dedicated bicycle storage facilities.

The container 100 may have a container floor 104, a container wall such as container walls 102a, 10-2b, 102c, 102d extending upwardly from the container floor 104, and a chamber 106 defined by the container floor 104 and the container wall. The container wall 102a may have a top 103t and a bottom 103t, with the bottom at or near the container floor, and a container roof may extend across the container at or near the top of the container wall. But in certain embodiments, the container walls may not extend to the roof; instead, netting, screening, glass/plastic materials, or nothing (the sidewall may be virtual, with compartment shields, disclosed below separating compartments when the container doors are opened) may extend from the container walls to the roof.

In addition, the container walls themselves may be solid or they may be formed from fencing, slats, or any enclosing material, selected at the option of the designer. In certain embodiments, the container is enclosed to protect the chamber completely from the elements; in other embodiments, the container may be partially enclosed to allow ventilation while still providing partial protection from the elements. In further embodiments, vents, windows that open, or other ventilation features may be provided in the container walls, to be opened or closed automatically or manually at the option of the designers and/or the facilities management. The container may be a single level high, or it may have multiple levels, with access to a compartment on a different level available via a ramp or through a compartment elevator associated with the moveable platform to move the compartment into alignment with the selected access door.

Figure 1C:
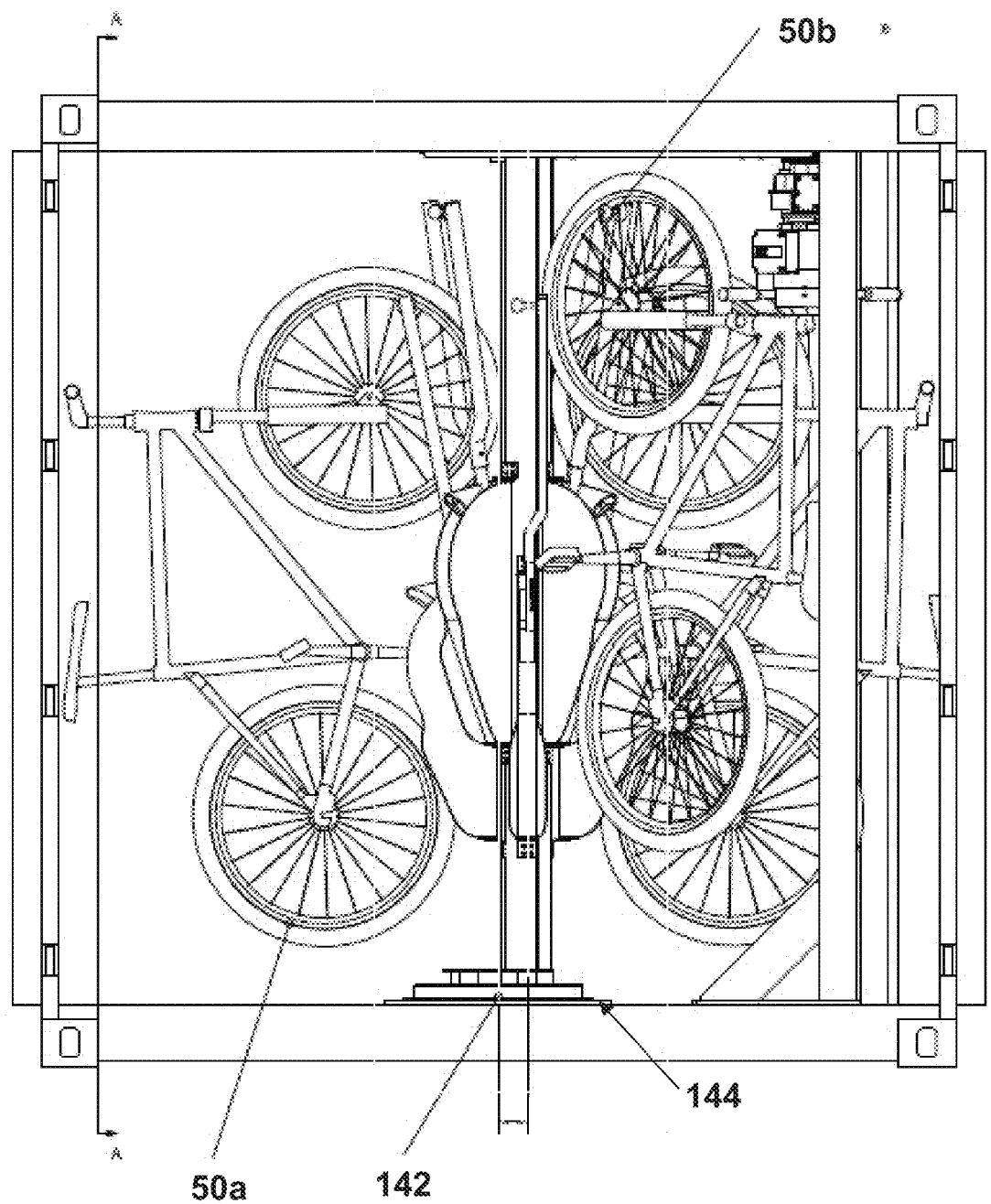
FIG. 1C is a front view of the interior of the bicycle storage container container 100, with a front-facing exterior wall removed and with bicycles stored therein.
Figure 1D:
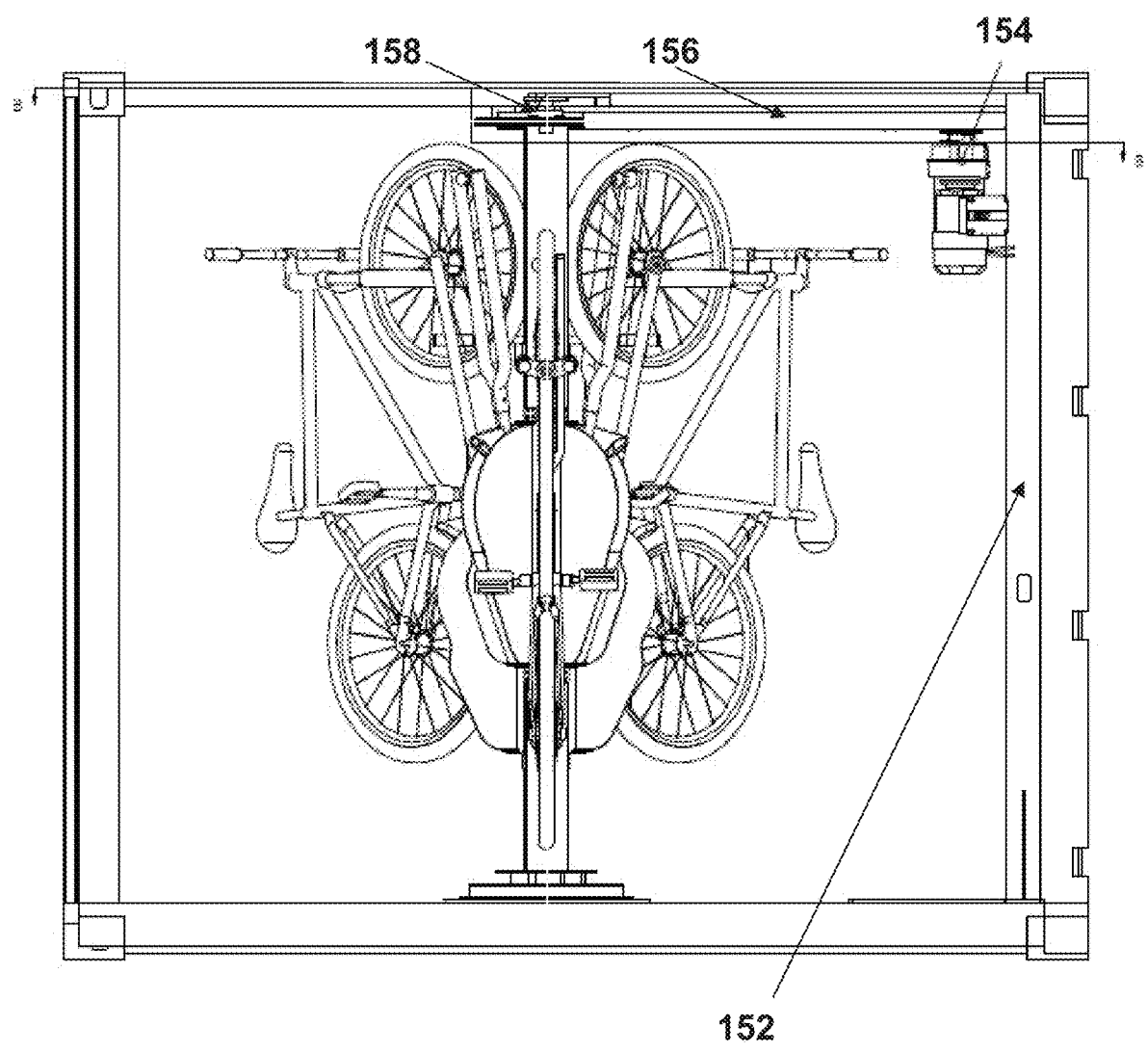
FIG. 1D is a front view of the interior of the bicycle storage container 100, as broken at the cut A-A shown in FIG. 1C.
Figure 1E:
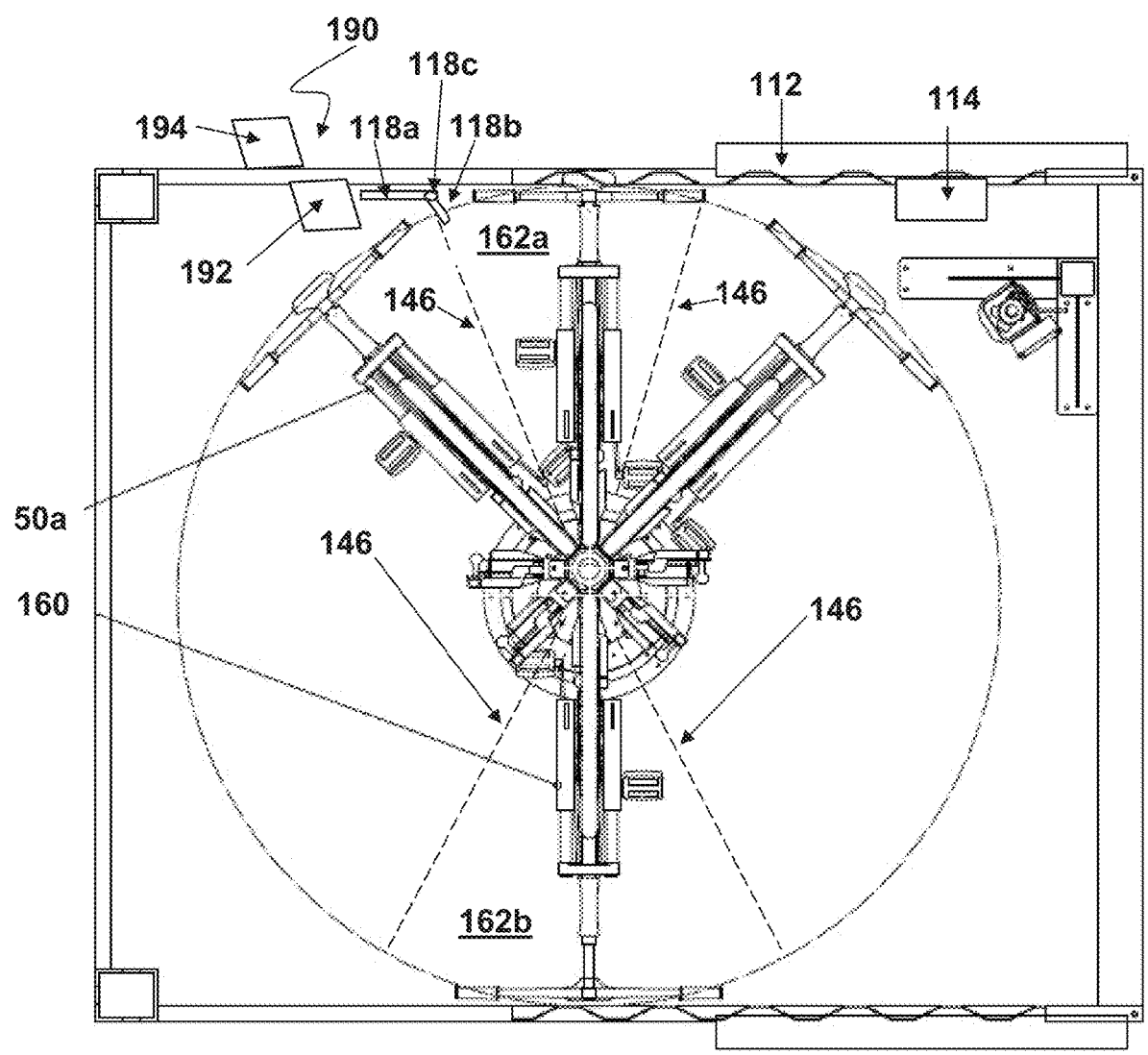
FIG. 1E is a top view of the interior of the bicycle storage container 100, as broken at the cut B-B shown in FIG. 1D.

The chamber 106 may have a turntable positioned on the container floor, with the turntable having a rotatable platform 140 on a base 144 that extends from the container floor 104, a mast 120 extending upwardly from the turntable 140, and a plurality of individual bicycle storage compartments such as compartments 162a, 162b in FIG. 1E for short or long term storage of bicycles spaced radially around the mast. The platform may be full-size, with a radius that extends from the mast to near to the container walls, or, as shown in the embodiment shown in FIGS. 1A-1F-2, the platform 142 may have a relatively short radius from the center of the base.

Figures 1, 1F:
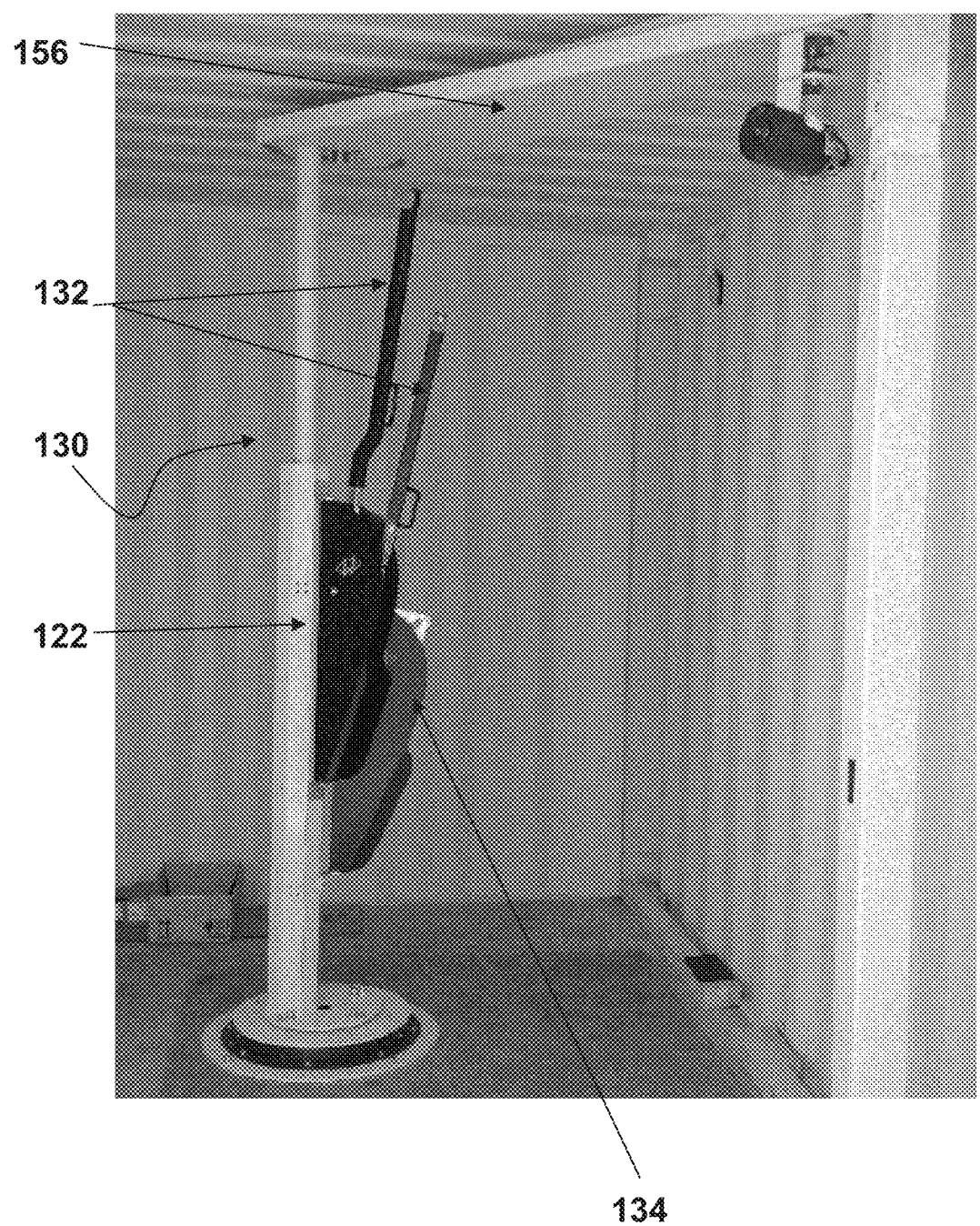
FIG. 1F-1 is a side view of the off-center mast 120 and hoist mechanism 130 of the bicycle storage container 100 and FIG. 1F-2 is a detail side view of the rotatable pin 158 that drives the rotation of the platform 142.
Figures 1, 1F, 2:
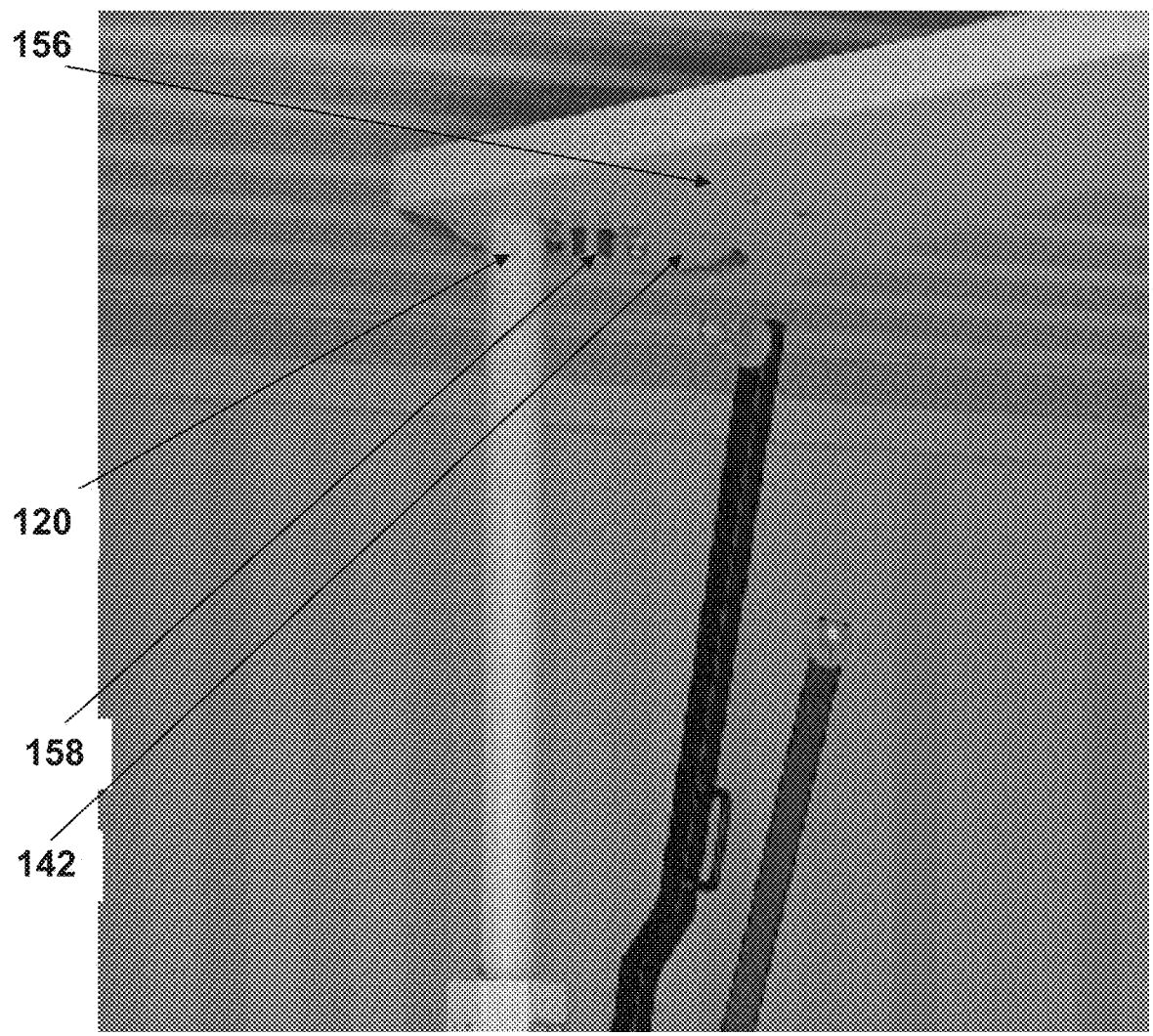
Figures 1, 1G:
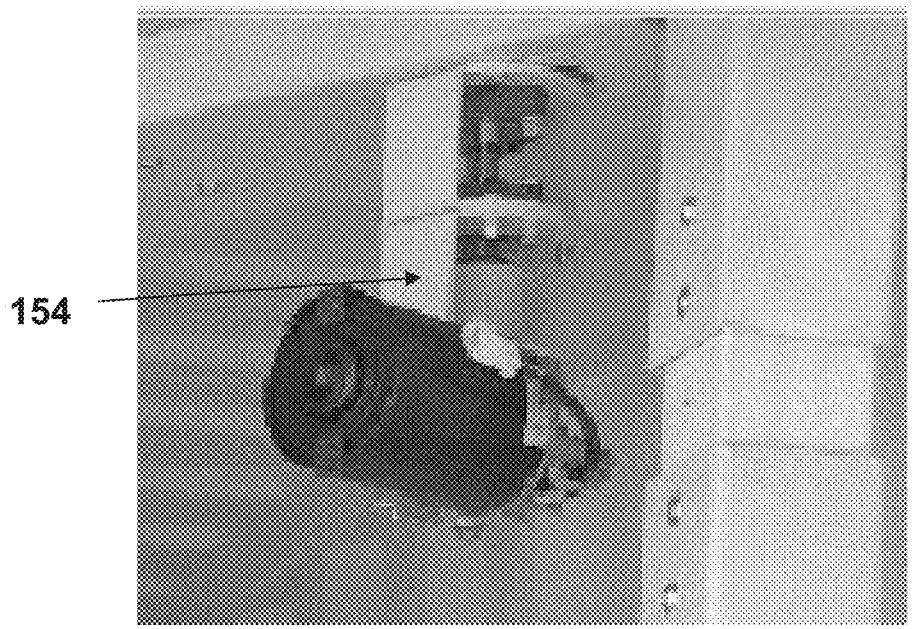
Figures 1, 1G, 2:
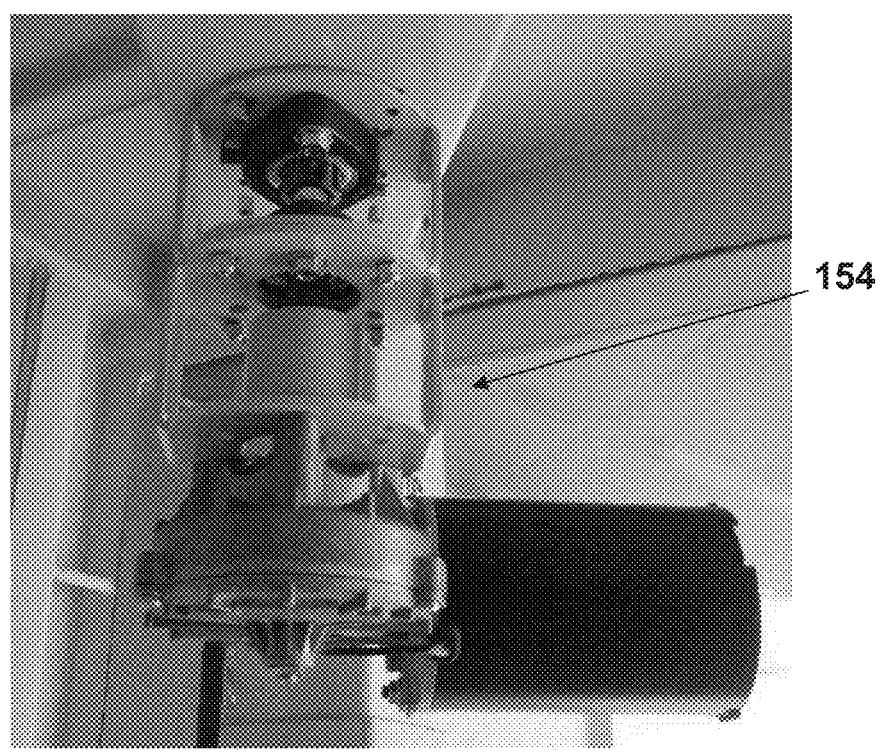
Figure 2:
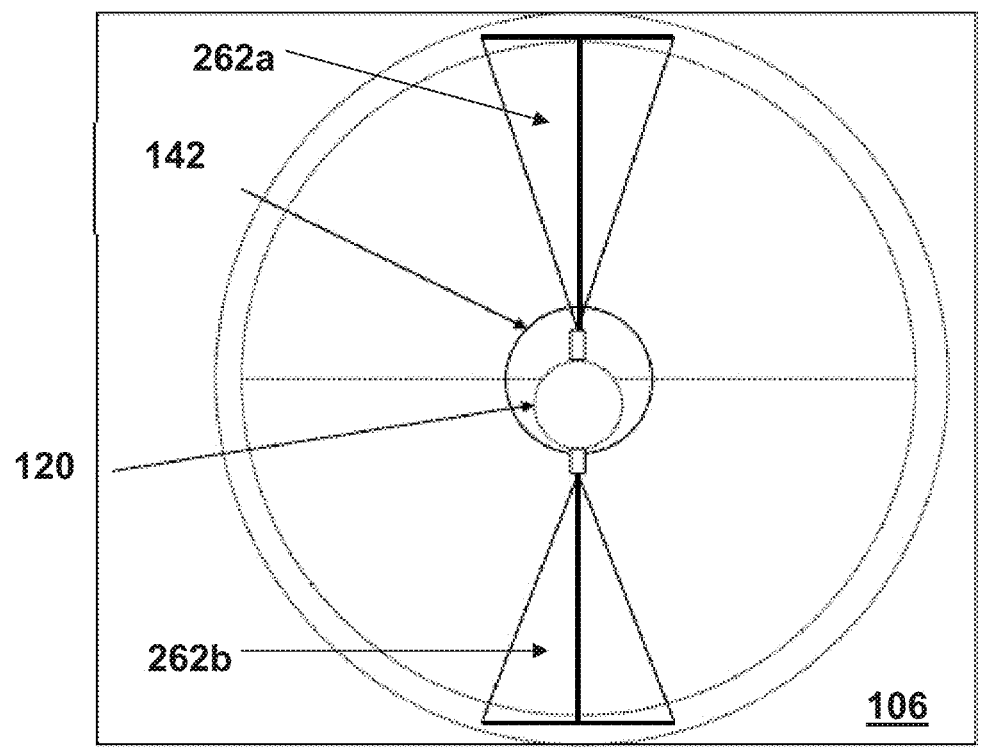

In one embodiment (shown in FIGS. 1C, 1D, and 1E, the mast 120 is offset from the center of the turntable 140 and a drive unit 150 eccentrically rotates the platform. A drive unit 150, which may be any conventional drive unit, may be attached to the top of a post 152 in a corner of the interior of the container that extends vertically from the floor of the container, but in other embodiments, the drive unit may be attached to the floor of the container. As shown in FIGS. 1G-1 and 1G-2, the drive unit 150 has a chain-driven motor 154 to redirect an extension arm 156 attached to a rotatable pin 158 and thus drive rotation of the platform 142. The drive unit shown in FIGS. 1G-1 and 1G-2 may drive the platform from the top of the container, but in other embodiments, the drive unit may drive the platform from the bottom of the container.

The bicycle storage compartments may be sized for housing a bicycle. The container may have bicycle storage compartments of differing volumes, with, as shown in FIG. 2, a first storage compartment 262a sized to store a first bicycle of a first size, a second storage compartment 262b sized to store a second bicycle of a second size; and with the volume of the first storage compartment 262a being different than the volume of the second storage compartment 262b. In certain embodiments, such as is shown in FIG. 1C and in greater detail in FIG. 2, the mast 120 may be off-set, providing the chamber 106 with compartments of varied lengths of sidewalls from mast to ends of the sidewalls near to the container wall.

Figure 6A:
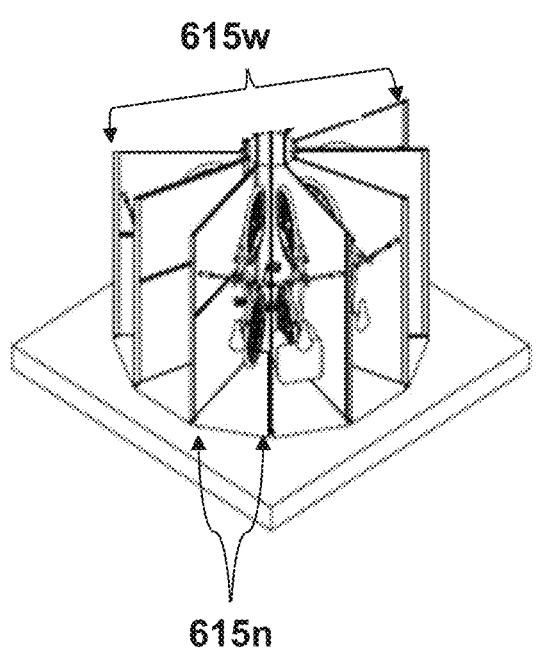
FIGS. 6A-6B are perspective views of the interior of an alternative embodiment of an exemplary bicycle storage container 600 having compartments with solid sidewalls and a variety of volumes, with FIG. 6A being a perspective view of compartments sized to store a single bicycle, and with FIG. 6B being a perspective view of a compartment sized to store multiple bicycles.
Figure 6B:
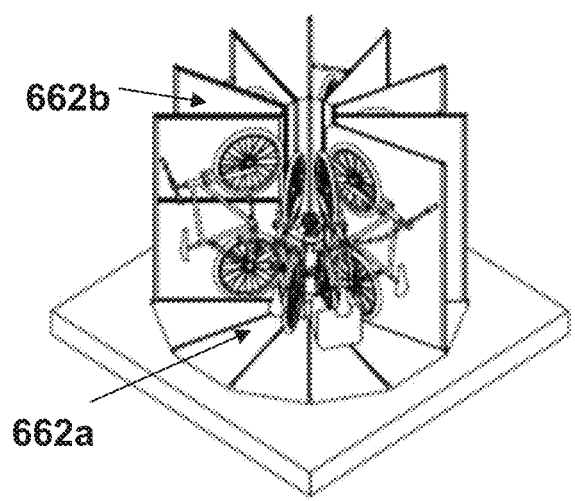

In certain embodiments, such as the exemplary embodiment shown in FIGS. 6A and 6B, an exemplary bicycle storage container 600 has compartments with solid sidewalls and of a variety of sizes. The first storage compartment 662a is sized to store a first number of bicycles, the second storage compartment 662b is sized to store a second number of bicycles, with the first number being different from the second number. FIG. 6B shows the compartment 662a sized to store a plurality of bicycles, and FIG. 6A shows the compartment 662b sized to store a single bicycle.

Figure 5A:
FIGS. 5A-5B are front views of stored bicycles, with FIG. 5A showing a front wheel up storage of a bicycle and with FIG. 5B showing a rear wheel up storage of a bicycle.
Figure 5B:

In one embodiment, compartments are laid out for vertical storage of the bicycle. In further embodiments, the selected compartment is sized to support front wheel up bicycle storage 590f (FIG. 5A); in other embodiments, the selected compartment is sized to support rear wheel up bicycle storage 590r (FIG. 5B) of the bicycle. For space optimization, compartments may be arranged with alternating layouts to allow bicycles to be stored in front or rear wheel up configurations. Alternating wheel up and wheel down storage compartments may be extremely space efficient, providing up to 20 bikes stored on one (regular) car parking space in a one level configuration, and up to 40 bikes in a stacked 2 level compartment configuration. In further embodiments, a compartment may have hanging components for rear wheel up storage of the bicycle and hanging components for front wheel up storage of the bicycle.

In further embodiments, as shown in FIGS. 1B-1E and particularly FIGS. 1F-1, 1F-2, and 1G, the container has a bicycle lift 130, also known as a hoist mechanism, to assist the bicyclist in storing the bicycles in front or rear wheel up configurations. The hoist mechanism 130 may be a conventional system with a gas-operated lever 132 such as the one shown in FIG. 1G, in which raising the lever 132 causes a sleeve 122 on the mast 120 to which the stored bicycle is attached to be lowered (with the weight of the bicycle causing gas in a cylinder 134 to compress). Lowering the lever 132 causes the compressed gas in the cylinder to release, which pushes up the mast sleeve to which the bicycle is attached and brings the bicycle into a storage position on the mast.

Compartments may be dedicated to a single user, or they may be assigned as space and need requires. Containers may be generally circular or polygonal in cross-section. In further embodiments, the selected compartment has at least one non-bicycle item storage holder for storing personal items of the bicyclist. The compartments may have personal item storage, such as storage bins, shelves, lockable drawers, and they may have lighting or e-charger capability.

The compartments may be defined by sidewalls extending radially relative to the mast toward the container wall, and the sidewalls may extend near to a compartment ceiling to ensure privacy and security by preventing "reach over" across compartments. In the embodiment shown in FIGS. 1B-1D, the sidewalls are not shown to facilitate views of the bicycles stored in the containers. In FIG. 1E one exemplary but not necessarily preferred embodiment of the sidewalls 146 extend a selected distance from on or near the mast to near the container wall, but in other embodiments, sidewalls 146 may extend from the mast or they may be attached to the mast. In other embodiments, a pair of contracting sidewalls may, in their contracted condition, extend from the container wall or near to the container wall to a length that is short enough so as to not impede with the rotation of the bicycles around the mast. As described in further detail below, when the container door is opened to provide access to a selected compartment, the sidewalls may automatically extend toward the mast a greater length to provide a compartment space therebetween that provides enough width to the selected compartment that a bicyclist may store or remove a bicycle, but that limits access to compartments adjacent to the selected compartment.

The sidewalls may be a solid material, or they may be formed of netting, wire, wood, or plastic fencing, slats or cloth on a frame, or in an embodiment where the platform extends from the base a significant amount, a sidewall may hang between vertical posts, one post near to the center of the platform and the other post at the far end of the platform. Further, sidewalls do not need to extend from floor to ceiling; sidewalls are positioned and sized to prevent "reach over" from one compartment into another. Further sidewalls may be provided with shelves, drawers, binds, compartments, or hooks to permit storage of personal items in a compartment.

Further, as seen in FIG. 1E, the container 100 may be equipped with a camera system 190 for motion or still picture acquisition outside the compartment (using outside camera 194) and/or inside the compartment (using the inside camera 192) to capture images of persons who access the compartment. The camera(s) may be connected to a processor such as facility processor 870 and associated storage to store the captured images and keep a log of persons who accessed compartments in the container. The container 100 may also have a door assembly 110 attached to the container wall that provides a door opening 115 that allows for loading and unloading the bicycle with an adjustable door width that is simultaneously sized to allow bicycle access into and out of a selected compartment or compartments when the turntable is rotated to align the selected compartment with the door; and arranged to limit or prevent access to compartments adjacent to the selected compartment when the door is aligned with the selected compartment.

In certain embodiments, among the plurality of bicycle storage compartments, one bicycle storage compartment has a widest opening 615w, another bicycle storage compartment has a narrowest opening 615n, and the selected compartment has an opening of a known width. The compartment opening width may be known through the width having been recorded in the computer records of the compartment, or it may be known through a reading of the width from the output of an electric eye, not shown, that is arranged to read the width of the selected compartment. In further embodiments, the door 112 of the door assembly 110 further may be wide enough to accommodate the widest opening 615w, and the assembly may have a compartment shield 116 that extends along at least a portion of a vertical side of the door for adjustably covering at least a portion of the door width, with the compartment shield reducing at least a portion of the door width a selected amount based on the selected width of the selected compartment.

In the embodiment shown in FIG. 1E, the compartment shield has a rigid arm that is affixed to the interior wall of the container near the door, and a flexible arm that is attached and approximately perpendicular to the rigid arm to extend from the interior wall of the container into the interior of the container. The flexible arm may be flexible due to the composition of the materials from which it is made, or it may be rendered flexible by being hinged to the rigid arm, for example, by a spring hinge 118c. Like the sidewalls, the flexible arm need not extend from floor to ceiling; it is positioned and sized to prevent "reach over" from one compartment into another. It may extend into the interior of the container a selected distance so as to not come into contact with the contacts of a filled compartment but, in the embodiments in which the sidewalls extend from the mast or near the mast to near the interior wall of the container, so as to contact a sidewall when the sidewall is moved adjacent to the flexible arm.

In operation, in the embodiments in which the sidewall extends from the mast or near the mast to near the interior wall of the container, when the platform 142 is rotated to bring the desired compartment into position at the door, the rotation brings a sidewall 146 into contact with the flexible arm 118b of the compartment shield 116. The flexible arm 118b and sidewall 146 form a wall from the container wall to near the mast that operates as a barrier between adjacent compartments. As the rotation continues, the spring hinge 118c between the rigid arm 118a and the flexible arm 118b continues opening, and the flexible arm 118b may bend a little further and its width may extend into the compartment. However, the width of the flexible arm 118b is sized so that the compartment shield 116 will not extend so far into the compartment that it impedes access to the contents of the compartment 162a when the door eventually opens, as it does when the desired compartment is in place in front of the door opening. The door closes again when access to the compartment is no longer required, and, when access to another compartment is needed, the rotation of the platform will cause the compartment shield to bend further toward the door opening. When the rotation causes the sidewall to move beyond the edge of the compartment shield, the spring hinge 118c will cause the flexible arm 118b to move into the adjacent compartment, with the operation of the spring hinge 118c causing the flexible arm 118a to return to its original position essentially perpendicular to the rigid arm 118a In other further embodiments, the door of the assembly may be a sliding door that is arranged to slide horizontally across the width of the opening of the compartment to change the door width from a widest door width to widths that accommodate the varied widths of the openings of the plurality of bicycle storage compartments while limiting or preventing access to other compartments, with, to gain access to the selected compartment, the sliding door adjusting the door width a selected amount based on the selected width of the selected compartment. In other embodiments, when the slidable door is arranged to slide vertically along the height of the opening of the compartment, the above-disclosed compartment shield may be provided to extend along at least a portion of a vertical side of the door to provide an adjustable width for adjustably covering at least a portion of the door width, with the compartment shield reducing at least a portion of the door width a selected amount based on the selected width of the selected compartment.

In still further embodiments, the compartment openings of the bicycle storage compartments extend across the compartments at or near the container wall, and the first storage compartment has a first compartment opening that is different in width from the opening of the second storage compartment has a second compartment opening, and the selected compartment has an opening of a selected width. Further, the door width is sized to accommodate a plurality of compartment opening widths, with the compartment shield being adjustable to change the door width to accommodate the selected width of the selected compartment.

Figure 3A:
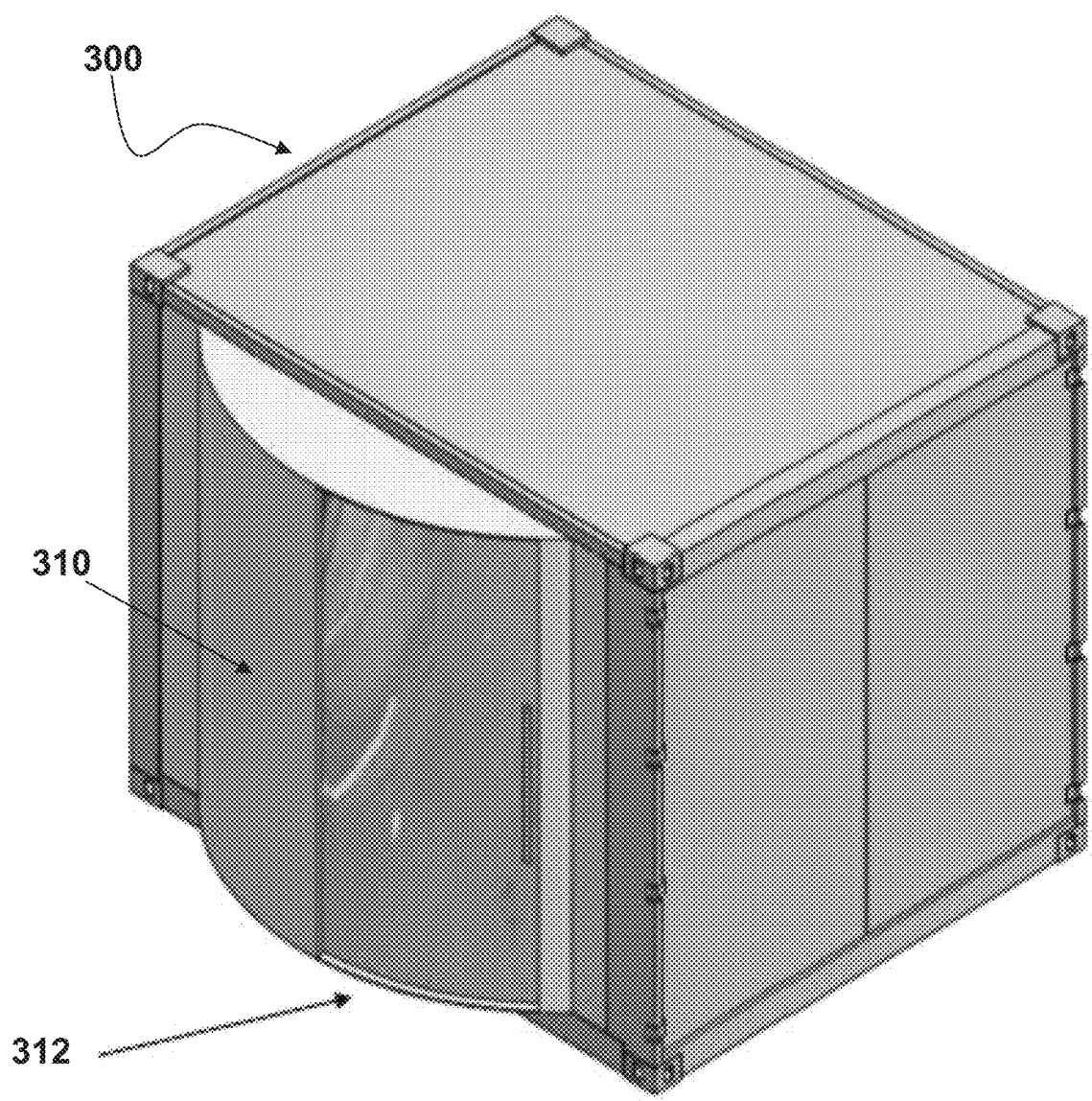
FIG. 3A is a perspective view of the exterior of an alternative exemplary bicycle storage container 300 with a closed curved door 312.
Figure 3C:
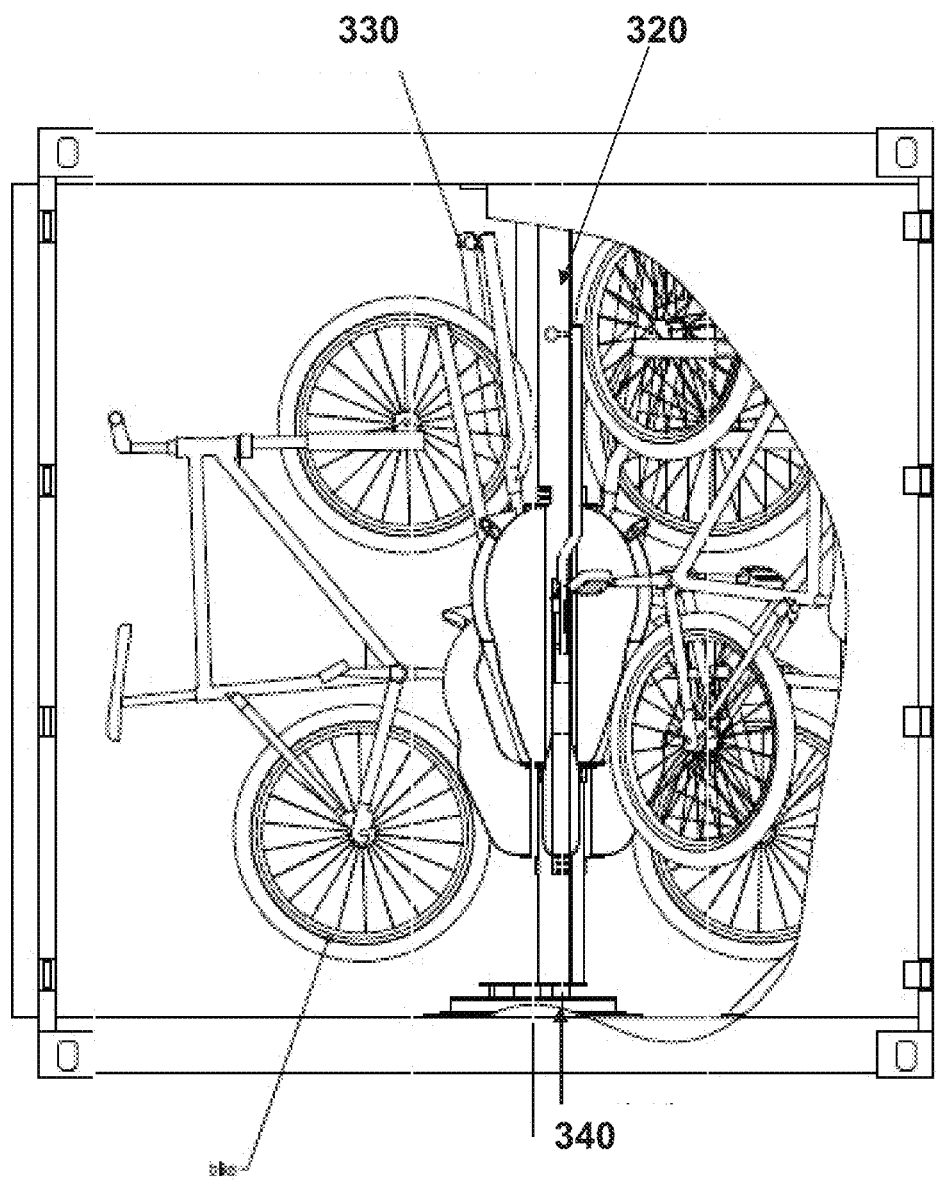
FIG. 3C is a front view of the interior of the bicycle storage container 300, with a portion of the exterior wall removed and with bicycles stored therein.
Figure 3D:
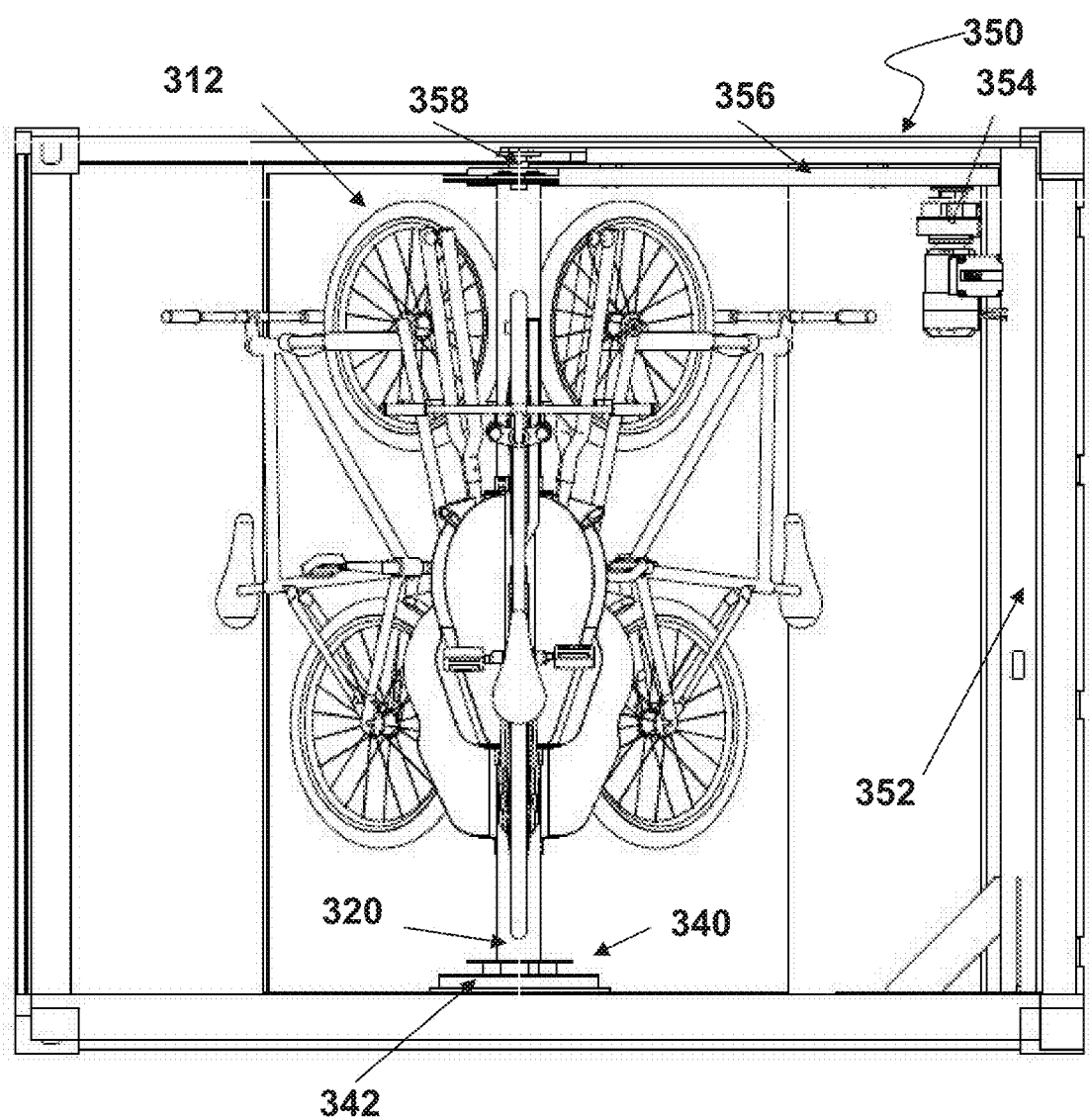
FIG. 3D is a front view of the interior of the bicycle storage container 300, as broken at the cut D-D shown in FIG. 3C.
Figure 3E:
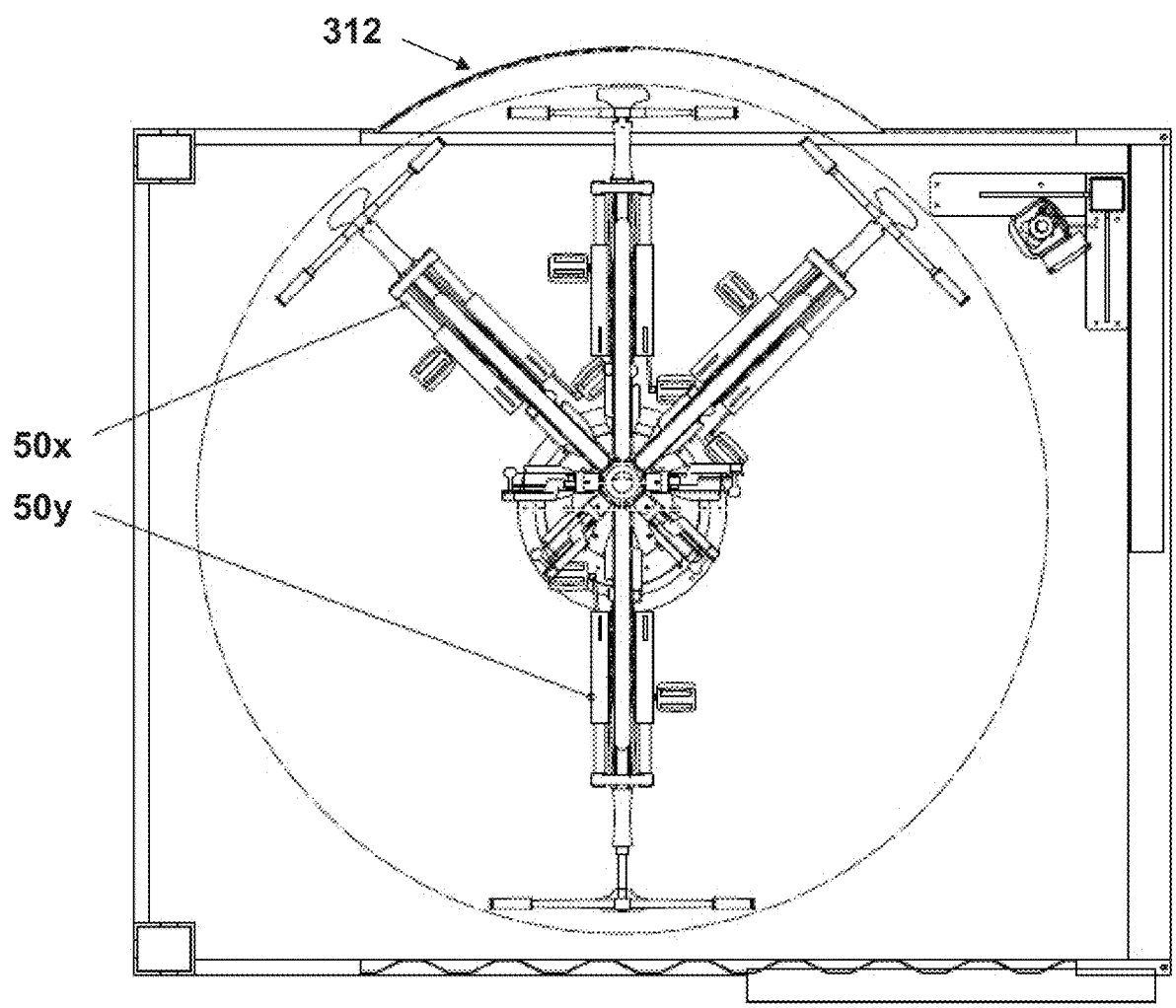
FIG. 3E is a top view of the interior of the bicycle storage container 300, as seen from the cut E-E shown in FIG. 3D.

In certain embodiments, as shown in FIG. 1A, the door may be planar. In other embodiments, as shown in FIG. 3A and FIG. 3B, the door may be curved convexly beyond the container wall. FIG. 3A shows the exterior of an alternative exemplary bicycle storage container 300 with a closed curved door 310, and FIG. 3B shows the exterior of the bicycle storage container 300 of FIG. 3A, with a portion of the exterior wall removed. FIG. 3C shows the interior of the bicycle storage container 300, with a portion of the exterior wall removed and with bicycles stored therein, and FIG. 3D shows the interior of the bicycle storage container 300, as broken at the cut D-D shown in FIG. 3C. FIG. 3E shows the bicycle storage container 300, as seen from the cut E-E shown in FIG. 3D, and FIG. 3F shows detail of the bicycle holding system shown in FIG. 3C with a hoist mechanism 330.

In one embodiment (shown in FIGS. 3C, 3D, and 3E and as with the embodiment shown in FIGS. 1F-1, 1F-2, 1G-1 and 1G-2, a mast 320 is offset from the center of the turntable 340 and a drive unit 350 eccentrically rotates the platform. As, a drive unit 350, which may be any conventional drive unit, may be attached to the top of a post 352 in a corner of the interior of the container that extends vertically from the floor of the container, but in other embodiments, the drive unit may be attached to the floor of the container. As shown in FIG. 3D, the drive unit has a chain-driven motor 354 to redirect an extension arm 356 attached to a rotatable pin 358 and thus drive rotation of the platform 342. As with the embodiment shown in FIGS. 1G-1 and 1G-2, the drive unit 350 may drive the platform from the top of the container, but in other embodiments, the drive unit may drive the platform from the bottom of the container.

As with the embodiment shown in FIGS. 1G-1 and 1G-2, the bicycle storage compartments may be sized for housing a bicycle. The container 300 may have bicycle storage compartments of differing volumes, with, as shown in FIG. 4, a first storage compartment 462a sized to store a first bicycle of a first size, a second storage compartment 462b sized to store a second bicycle of a second size; and with the volume of the first storage compartment 462a being different than the volume of the second storage compartment 462b. In certain embodiments, such as is shown in FIG. 3C and in greater detail in FIG. 4, the mast 320 may be off-set, with the mast center 421 offset from the platform center 443, thus providing the chamber 306 with compartments of varied lengths of sidewalls from mast to ends of the sidewalls near to the container wall.

Further, a variety of embodiments of container geometries are contemplated. In one embodiment, the container is generally circular or has curved walls. In other embodiments, the container is polygonal in cross-section, with the container wall formed with a first number of sides, with the chamber having a second number of compartments, and with the first number of sidewall sides being different from the second number of compartments. In other embodiments, the container has a width, and a compartment space encompassing the plurality of bicycle storage compartments has a boundary with a cross-section that is co-planar with the container width, wherein the compartment space cross-section has a diameter that is longer than the container width, and the door in the container wall is sized and curved convexly from the container wall to accommodate the compartment space. In a further embodiment, the container is a recycled standard cargo container, which, typically being longer than it is wide, has a door in the container wall that is sized and curved convexly from the container wall to accommodate the narrower width.

Figure 7A:
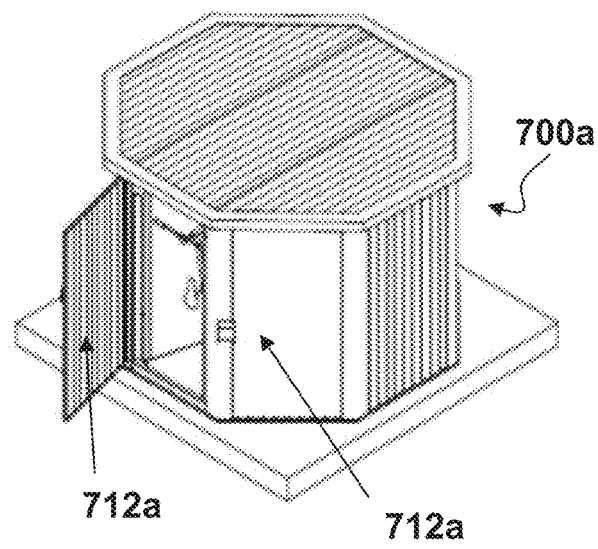
FIGS. 7A-7C are views of an alternative embodiments of bicycle storage containers, with FIG. 7A being a perspective view of the exterior of the container 700a with facing access doors 712a, 712b; with FIG. 7B being a front view of the container 700b with one door 712a open to one compartment; and with FIG. 7C being a top view of the interior of container 700c with a door 712c providing access to two compartments.
Figure 7B:
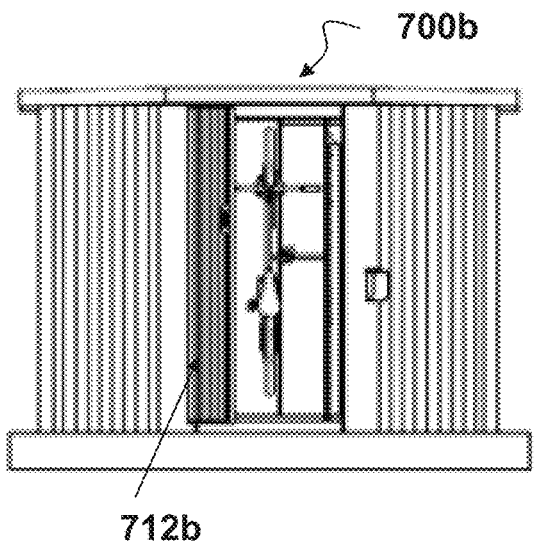
Figure 7C:
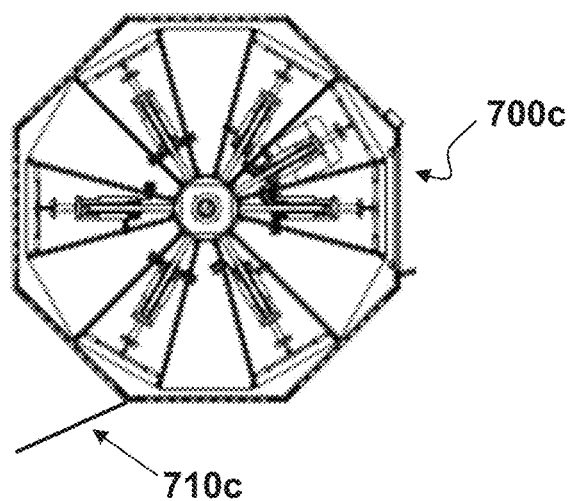

In yet other embodiments, a variety of container doors may be provided to accommodate the need for different kinds off access to compartments. For example, FIGS. 7A-7D show exemplary bicycle storage containers, with FIG. 7A showing a container 700a with facing access doors 712a, and FIG. 7B showing one open door 712b providing access to one compartment. FIG. 7C shows a container 700c with a door 712c providing access to two compartments to allow access to more than one compartment, for example should the user have rented two different compartment.

In use, the user may access a selected compartment through communication components including (for example) a radio-frequency identification (RFID) card that identifies the compartment assigned to the user, and control components associated with the movable motorized platform to bring the desired compartment into alignment with the selected access door and to unlock the access door for loading and unloading.

Computer-Based Bicycle Storage Control System 800

A computer-based bicycle storage control system 800 according to the present invention will now be described in detail with reference to FIGS. 8A to 8E of the accompanying drawings. The bicycle storage control system 800 is a system providing booking of a bicycle storage compartment to a user or an invitee of the user based on information related to location of a bicycle storage container, volume data associated with the bicycle storage compartments in the container, and dimensional data about the bicycle to be parked and stored.

Figure 8:
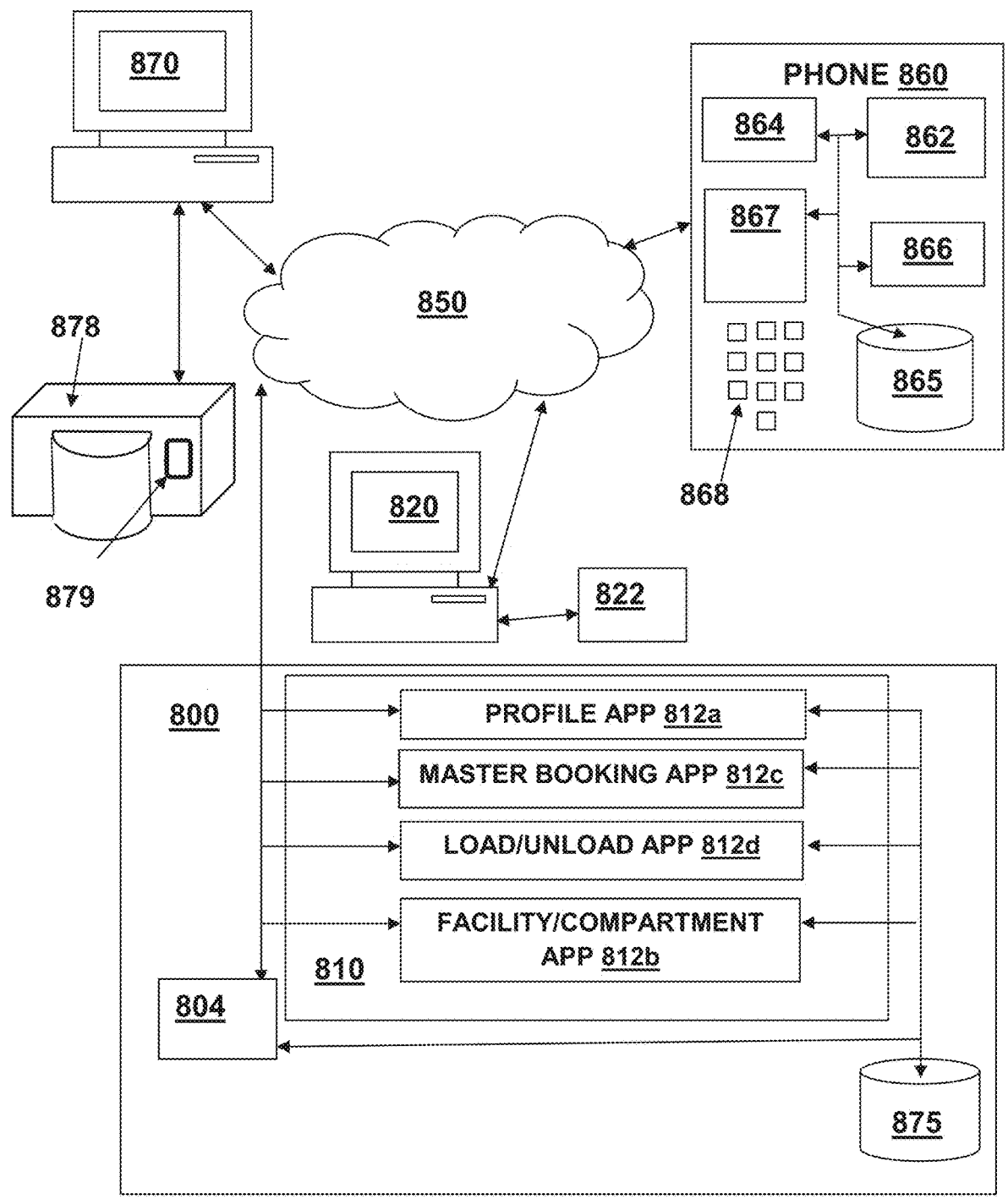
FIG. 8 is a block diagram of an exemplary computer-based bicycle storage control system.

As shown in FIG. 8, the bicycle storage control system 800 has at least one processor such as a server 810 to manage at least one bicycle storage facility 878, each facility assigned its own unique identifier, and each storage compartment assigned its own unique identifier within a facility, and the server 810 in communication with a processor 870 electronically connected to the facility 878, and to user processors 820, 860, and a storage unit 875 electronically connected to the server 810.

The components depicted in FIG. 8 may be operatively connected to one another via a network, such as the Internet 850 or an intranet, or via any type of wired or wireless communication system. Connections may be implemented through a direct communication link, a local area network (LAN), a wide area network (WAN) and/or other suitable connections.

The computer system may also have a memory and a non-transitory computer-readable medium encoding instructions for computer-based booking of the compartments and for execution by the processor. The instructions may be programmed to cause the processor to receive, into the memory, a request for access to bicycle storage; and in response to receiving the request to access the bicycle storage, provide access to the selected compartment based on dimensional specifications of the bicycle and the selected volume of the selected compartment.

The instructions may be organized into a series of applications, also called apps, for establishing passwords, inputting passwords to authenticate use of the system 800, developing or updating a user profile on the system 800, arranging for a user to authorize the use of the system 800 by an invitee of the user, reserving a compartment for use by the user or for an invitee, and paying for the reservation. The applications may be hosted on the server 810, and may include a profile app 812a for establishing user password(s) and developing or updating a user profile, a facility/compartment control app 812b for developing or updating records relating to facilities and compartments records, a master booking app 812c for determining an available, suitable compartment based on user preferences, reserving the suitable compartment, and accepting payment for the booking, and a load/unload app 812d for providing access to the selected compartment and securing the compartment from unwanted access.

The apps 812*a*, 812*b*, 812*c*, and 812*d* may have computer implementable instructions encoded in a non-transitory computer-readable medium for execution by a processor such as the server 810. The storage unit 875 may be used for storing instructions such as those in apps 812*a*, 812*b*, 812*c*, and 812*d* and data for operating a website 804, populating the website with data about booking compartments, with fillable forms for users to use in establishing or updating passwords or user profiles, for inputting user preferences, requesting reservations, authorizing invitees, and making payment for the reservations. The storage unit 875 may also be used for storing instructions such as those in apps 812*a*, 812*b*, 812*c*, and 812*d* and data for managing the bicycle storage facility or facilities, including accepting user-supplied data and acting on it to establish or update user profiles records, to accept user preferences, identify appropriate compartments, make reservations, establish authorized invitees, accept payment, provide access to the selected compartment, and secure the reserved compartment from unwanted access.

Interaction with the Bicycle Storage Control System

Users of the system 800 may communicate with the server 810 and access the website 804 using computer 820. Computer 820 may be a remote special-purpose computer at a location such as a public transportation facility, an office building, other public building, or mall, or it may be general purpose computer such as a desktop computer, laptop computer, tablet, or any other conventional or known computing devices. Users of the system 800 may also communicate with the server 810 and access the website 804 using a telephone such as a mobile telephone 860 that may communicate with users' own computers 820 or to the servers 810.

Users of the system 800 may also communicate with the server 810 with another form of user processor, the user's telephone 860, which may host an application 862 for facilitating access to the bicycle storage control system 800, and for providing on-line access for the user. The telephone 860 may also have a display 867 for displaying data from the authentication system 800. The telephone may also have an integrated storage device 865 for storing instructions and data for operating the telephone 860, for managing interactions with the system 800, and for managing the on-line connections. The telephone 860 may also have a user module 866 for use in accessing the integrated storage device 865. The telephone 860 may also have a keypad 868 for use in telephoning, providing passwords and instructions to the telephone processor, and inputting other data, such as for establishing passwords, inputting passwords to authenticate use of the system 800, developing or updating a user profile on the system 800, arranging for use of the system 800 by an invitee of the user, reserving a compartment for use by the user or for an invitee, and paying for the reservation.

As shown in FIG. 9A, the profile application 812*a* may have an I/O module 910*a* to process communications to and from the server 810. The application 812*a* may have a profile module 920*a* for developing at least one website profile page that may be customized to the user, and a display module 930*a* for facilitating the display of the website pages.

The profile application 812*a* may also have modules for providing other features, functionality, and pages of the website 804, such as a communication module 940*a* for issuing and processing instructions from the user computer 820 or phone 860, a presentation module 950*a* for presenting the website profile pages to the user at computer 820 or phone 860, an input capture module 960*a* for capturing input from the user so that a user may set up a user profile that will allow for expedited booking, an association module 970*a* for associating the input with a profile to form a profile for the user, and a storage module 980*a* for storing data related to the user, such as particulars of the user (email, phone), payment data (credit/debit card, the Paypal™ payment system available from PayPal Holdings, Inc. of San Jose, Calif., deposit accounts, or another conventional payment system), preferred facilities, preferred compartment(s), passwords, bicycle(s) commonly stored, including dimensional specifications and nicknames with which to distinguish user bicycles, authorized invitees of the user, bicycles currently stored and the facilities and compartments in which the bicycles are stored, and other useful data. Development of a user profile expedite future transactions and provides security to prevent anonymous storage of dangerous devices. The user profile app 812*a* may also have a reporting module 990*a* for providing access reports showing all loading and unloading transactions including video or photo recordings As shown in FIG. 9B, the facility/compartment access control application 812*b* may have an I/O module 910*b* to process communications to and from the server 810. The application 812*b* may have a facility access module 920*b* for accessing a facility's profile to populate a website profile page that contains data related to a facility and its associated compartments, and a display module 930*b* for facilitating the display of the website pages.

The application 812*b* may also have modules for providing other features, functionality, and pages of the website 804, such as a communication module 940*b* for issuing and processing instructions from the facility computer 870, a presentation module 950*b* for presenting the facility profile website pages to a facility manager at the facility computer 870, an input capture module 960*b* for accepting input from the facility manager, an access module 970*b* for generating and issuing an authorization that allows the facility manager to access the application, and a storage module 980*b* for storing data related to the facility and its compartments, such as locations of a facility, and particulars of the compartments in the facility, such as features (size and/or volume, and accessories such as bins, shelves, or multi-bicycle storage capacity), availability (including current availability, future availability and unavailability dates), rental history (including renter data), and cost data related to rental of a compartment. In certain embodiments, the data related to a compartment may even include the type(s) of bicycles (by dimensional specifications) that a compartment is able to accommodate. In certain other embodiments, the particulars of the facilities and compartments in the facilities may be collected, updated, and stored automatically; and other particulars, such as repair or cleaning history, may be input by a human facility manager.

Figure 9C:
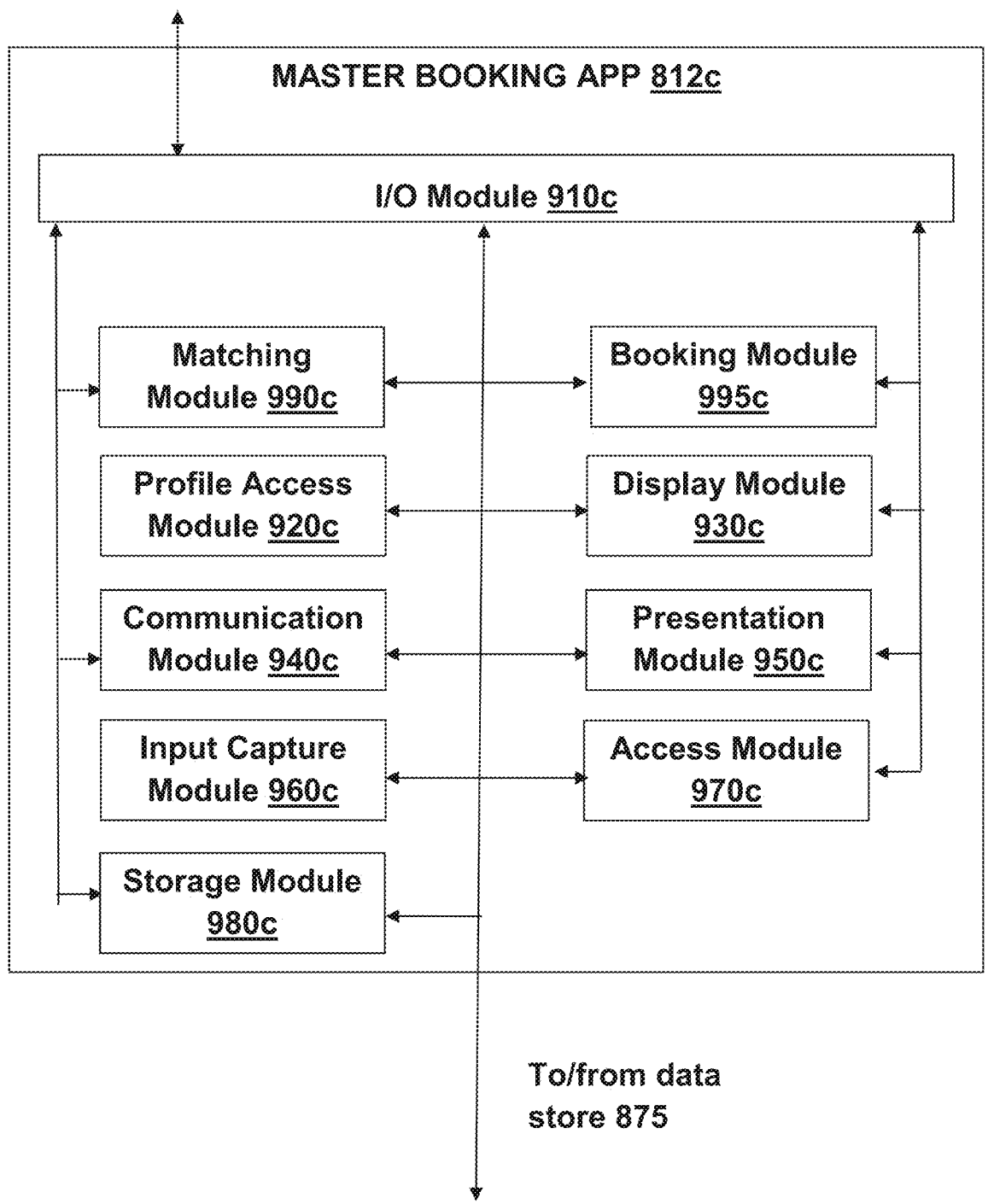
FIG. 9C is a block diagram of a master booking application for use in receiving booking instructions from a user, accepting user preferences, identifying a suitable compartment based on the user preferences, receiving payments, and establishing and updating user profiles, booking rentals of compartments, establishing authorized invitees, accepting payments.

As shown in FIG. 9C, the master booking application 812*c* may have an I/O module 910*c* to process communications to and from the server 810. The application 812*c* may have a profile access module 920*c* for accessing profiles prepopulated using the profile module 812*a*, a display module 930*c* for facilitating the display of the website pages for booking.

The application 812*c* may also have modules for providing other features, functionality, and pages of the website 804, such as a communication module 940*c* for issuing and processing instructions to and from the user computer 820 or phone 860, and a presentation module 950*c* for presenting booking website pages that are prepopulated with user data from earlier use of the user profile app 812*a*. The app 812*c* may also have an input capture module 960*c* for accepting input from the user related to changes in the prepopulated user data, booking preferences related to facility location, compartment features, bicycle data (dimensional specifications for the bicycle or nickname(s) to identify the bicycle(s) to be stored) and payment instructions. The app 812*c* may also have an access module 970*c* for generating and issuing an authorization that allows the user to access the application 812*c* or to access the user profile app 812*a* for on the spot updating of a user profile, and a storage module 980*c* for storing data related to the user's compartment booking input on the server 810.

The app 812*c* may also have a matching module 990*c* for matching the user's booking specifications to one or more available suitably sized and featured compartments at a desired facility, and a booking module 995*c* to book one of the matched compartments according to the user's preferences and compartment specifications. The presentation module 950*c*, in conjunction with a display module 930*c*, may also present the booking options on the booking website pages that identify available compartments and facilities for the user's selection; the input capture module 960*c* may also accept input from the user related to preferences among the presented booking options and payment data; and the presentation module 950*c*, in conjunction with the display module 930*d*, may also present the user with a display of the completed reservation, including location of the reserved facility and compartment. The presentation module 950*c*, in conjunction the I/O module 910*c*, may also communicate with the user's phone 960 or computer 920 or a printer (not shown) to present a receipt for the reservation.

It is to be understood that the modules of the master booking app 812*c* may be adapted to accommodate authorizations by users for access to compartments by invitees of the user at the point of booking, so that booking websites pages that are prepopulated with user profiles may be modified at the convenience of the user to allow access by an invitee. The master booking app 812*c* may also be adapted to accommodate bookings by the user's authorized invitees, so that booking websites pages that are prepopulated with user profiles may be modified at the convenience of the invitee. The modules of the user profile app 812*a* may allow a user to define which features of the user profile may be modified or updated by specified invitees.

Figure 9D:
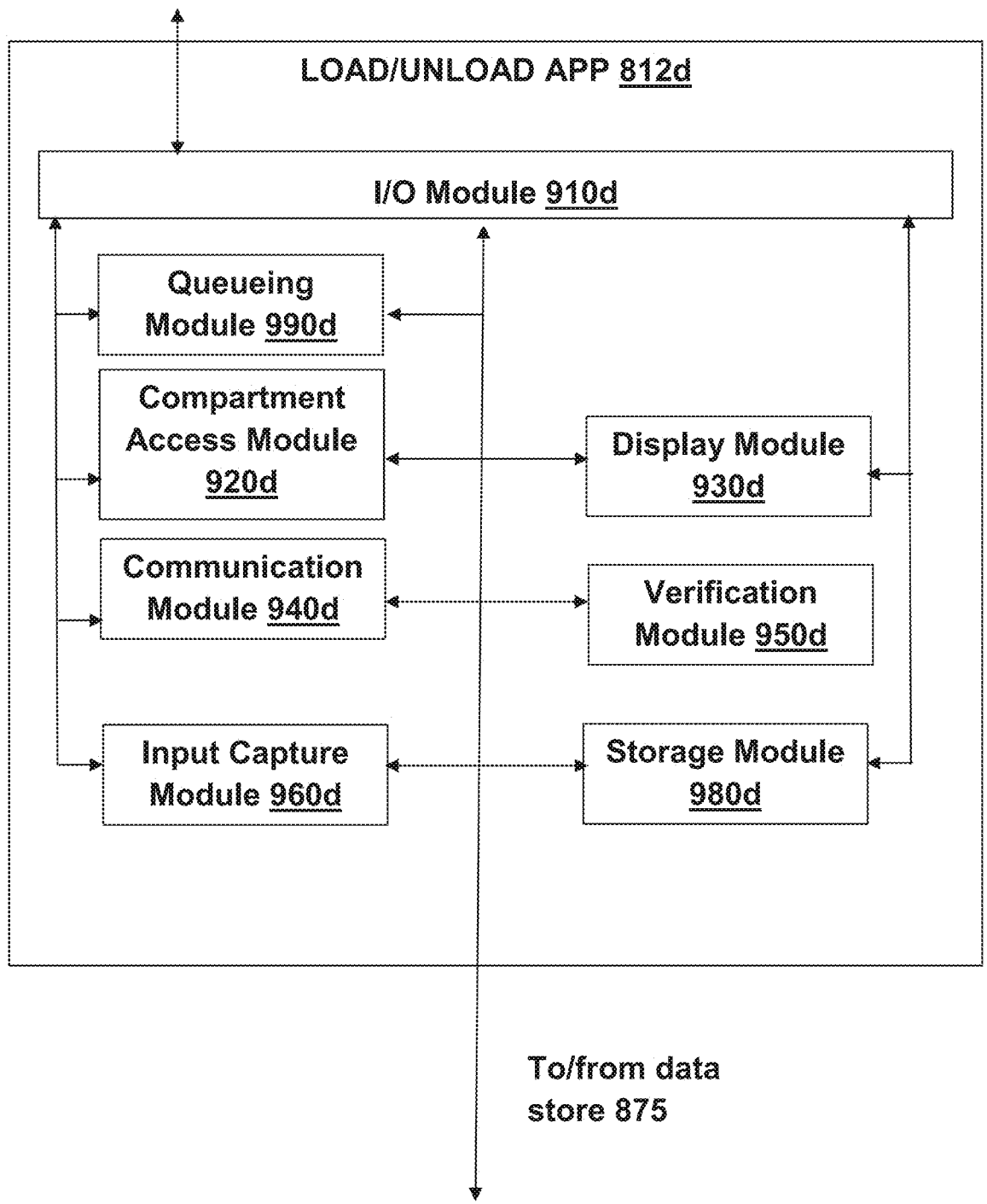
FIG. 9D is a block diagram of a load/unload application for use in providing access to the selected compartment to a user or invitee, and securing the reserved compartment from unwanted access.

As shown in FIG. 9D, the load/unload application 812*d* may have an I/O module 910*d* to process communications to and from the server 810. The application 812*d* may have a compartment access module 920*d* for receiving an access request by a user or invitee and for generating and issuing an access instruction to the facility's door operation controls 114 in FIG. 1E that allows the user to access the compartment, and a display module 930*d* for facilitating the entry of an access request by the user or invitee.

The application 812*d* may also have modules for providing other features, and functionality, such as a communication module 940*d* for issuing and processing instructions from the user at the facility, an input capture module 960*d* for accepting the access request input from the user, including identification of the booking, a storage module 980*d* for storing data related to the user's access to the compartment, and a verification module 950*d* for confirming the identity of the user and verifying the authenticity of the presented reservation. Upon identification and authentication, the compartment access module 920*d* may issue instructions to the facility's platform rotation and door operation controls 114 to allow the identified user or invitee access to one the authorized storage compartment, with the container door opening onto only the authorized compartment and with access to adjacent compartment being prevents be a system designer's choice of full or partial, solid, fenced or netted sidewalls, selective closing of container doors or compartment shields.

The contents of the access request from the user or invitee may be at the option of the system designer. For example, the user may provide verification data that identifies the compartment reservation, such as a booking number (to verify the booking). Alternatively, a scanner (not shown) may be available at the facility access port, and the user may scan a paper copy of the reservation receipt or an electronic copy from a receipt that had been sent to his or her telephone) to identify the reservation. For additional security, the user may input a password. Alternatively, the system designer may choose to allow the user to identify the location of the compartment (for example by number) that the user has been provided, and user identification. In order to confirm that reservation, the communication module 940*d*, in conjunction with the storage module 980*d* and the verification module 950*d*, may confirm the reservation and authorize the compartment access module 920*d* to instruct the facility's door operations controls to provide access to the compartment by the user.

In certain embodiments, control of container and compartment access and the user's account may be conducted via the cloud. Particularly in the multiple container/compartment system, using the modules of the master booking app 812*c* and the load/unload app 812*d*, the user may access his or her compartment in a selected container by transmitting load/unload instructions via a secure smartphone app. The load/unload app 812*d* may have a queuing module 990*d*, which provides instructions to queue the selected compartment so that, upon arrival of the user at the facility, the reserved compartment is already in alignment at the access door in the loading/unloading position.

Also at the option of the user, the facilities and components of the computer-based bicycle storage and control system may be provided with self-powering features, for example with solar panels and solar-chargeable batteries supplying efficient power to facilities and processing components.

One skilled in the art will appreciate that although only one or two of the components identified above is depicted in the Figures, any number of any of these components may be provided. Furthermore, one of ordinary skill in the art will recognize that there may be more than one phone 860, or more that two computers 820, and that functions provided by one or more components of any of the disclosed systems may be combined or incorporated into another component shown in the Figures.

One or more of the components depicted in FIG. 8 may be implemented in software on one or more computing systems. For example, they may comprise one or more applications, which may comprise one or more computer-readable instructions which, when executed by a processor, cause a computer to perform steps of a method, or they may be combined to provide multiple functionalities. Further, while the modules are shown in the figures as associated with a specific processor, such as servers 810, facility processor 870, user processor 820, or user telephone 860, or system, such as system 800, it is to be understood that a module may operate on any other processor shown or not shown or it may be a standalone program.

Further, the instructions for the module may be stored on the storage device associated with the specific processor or any other storage device, or they may be stored on one or more storage devices, and transferred to run on the shown processor or other or multiple processors. Computer-readable instructions may be stored on a computer-readable medium, such as a memory or disk. Such media typically provide non-transitory storage. Alternatively, one or more of the components depicted in FIG. 11 may be hardware components or combinations of hardware and software such as, for example, special purpose computers or general purpose computers. A computer or computer system may also comprise an internal or external database. The components of a computer or computer system may connect through a local bus interface.

The databases and storage units shown in FIG. 8 may be implemented as separate databases and repositories on a storage 875, as shown in FIG. 8, or as one or more internal databases stored, for example, on the server 810. Storage unit 875 may be accessed by other components in system 800 directly via an external connection or via a network (not shown). Further, the user interfaces employed by the system 800, as shown in FIG. 8, may be integrated into the system 800, or they may be separate units.

Workflows

Figure 10:
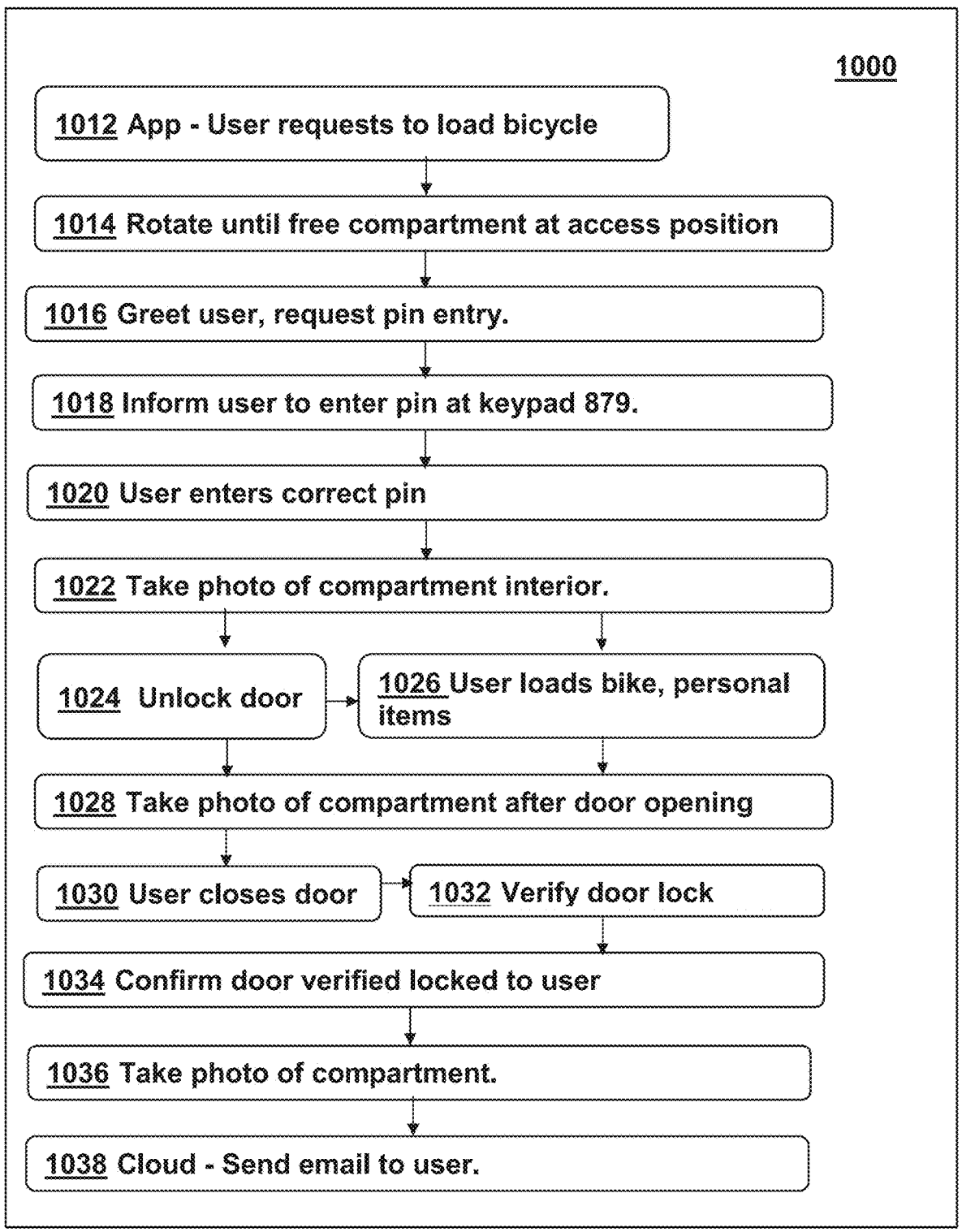
FIG. 10 is a flow chart showing a workflow 1000 for loading a bicycle into a capsule.
Figure 11:
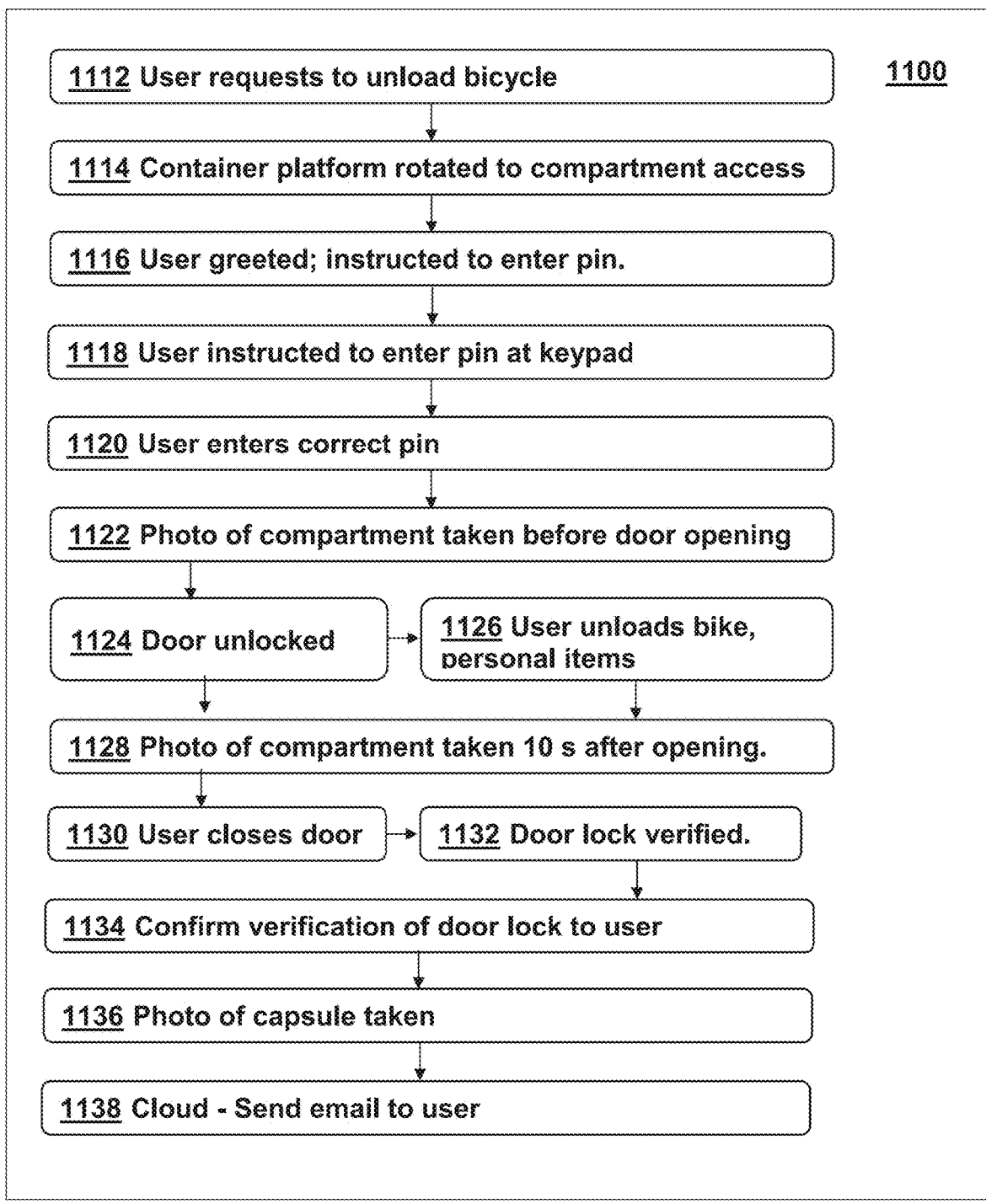
FIG. 11 is a flow chart showing a workflow 1100 for unloading a bicycle from a capsule.

FIGS. 10-12 show an exemplary embodiment of workflows for the operation of a computer-based bicycle storage and control system. Specifically, FIG. 10 shows a workflow 1000 for loading a bicycle into a compartment; FIG. 11 shows a workflow 1100 for unloading a bicycle from a compartment; and FIG. 12 shows a workflow 1200 for allowing third party access to a compartment.

Workflow 1000: Loading a Bicycle into a Compartment

In a stage 1012, using the user booking app 862 or 872, the user identifies him or herself and submits a request to load a bicycle into a container. The user may reserve space at a facility location ahead of time, e.g. before leaving home to park the bike at work. Users may permanently rent a specific storage capsule, e.g. at their apartment building or at a facility in the train station near their work so that they can complete their commute by bicycle. Using the master booking app 812c, the user profile app 812a, and the compartment access control app 812b, the processor determines whether a user profile exists for the user and, if not, creates a user profile for use in booking compartments.

Matching a User to a Compartment

In a stage 1014, and, in conjunction with user booking app 862, 822, using the master booking app 812c, the processor identifies a compartment that is suitable for use by the user using data related to location of a desired bicycle storage facility, and size or volume data associated with storage containers in the desired storage facility, dimensional data about the bicycle to be parked and stored, and whether the compartment meeting the user requirements is available.

In certain embodiments, the dimensional specifications of the bicycle to be stored may be at least one of the following specifications:

a length of the bicycle, as measured from front to rear of the bicycle ("bike length");

a seat height of the bicycle, as measured from the ground to a top of the bicycle's seat (with the top of the seat being the highest vertical point of the seat relative to the ground when the bicycle is standing upright on the ground with the wheels of the bicycle in contact with the ground);

a handlebar height of the bicycle, as measured from ground to a top of the bicycle's handlebars (with the top of the handlebars being the furthest vertical point of the handlebars relative to the ground when the bicycle is standing upright on the ground with the wheels of the bicycle in contact with the ground); and a handlebar width of the bicycle comprising a length across the bicycle's handlebars, measured from a furthest right end of the right handlebar to a furthest left end of the left handlebar.

In certain embodiments, the memory may contain records associated with a plurality of bicycles, with the records created when the user set up his or her user profile using the profile app 812a. Specifically, the user may have identified the dimensional specifications for a bicycle that he or she intended to store, and the dimensions would be identified in a bicycle record associated with the user, with the user identifying a nickname for the bicycle should the user register more than one bicycle in the user profile. In the current embodiment, the user's request may identify the bicycle to be stored, for example by nickname, if more than one bicycle is associated with the user in the user profile. The instructions may further cause the processor to access the records for the identified bicycle to obtain the dimensional specification of the bicycle to be stored. The instructions may also cause the processor to identify unoccupied bicycle compartments at the desired storage facility location, to access a compartment record for available compartments, with the compartment records containing specifications for size and volume of compartments. The instructions may also cause the processor to compare the size and volume specifications of available storage compartments against the stored dimensional specifications, and to identify an unoccupied bicycle storage compartment that could accommodate the bicycle to be stored based on the comparison.

In another embodiment, the user's booking request may identify the dimensional specifications of the bicycle to be stored; and the instructions may cause the processor to identify unoccupied bicycle compartments at the desired storage facility location, to compare the size and volume specifications of the unoccupied storage compartments against the input dimensional specifications, and to identify an unoccupied bicycle storage compartment that could accommodate the bicycle to be stored based on the comparison.

In even another embodiment, the memory may further contain dimensional characteristics of typical bicycles in bicycle records, with the bicycle records storing dimensional specifications for the plurality of bicycles by product (for example, bike length, the seat height, the handlebar height, and the handlebar width of a bike of a certain model, size and manufacturer. A user's booking request may identify product data for the bicycle to be stored (such as model X, size Y and made by manufacturer Z); and the instructions may cause the processor to identify unoccupied bicycle compartments at the desired storage facility location, to look up the dimensional specifications of the bicycle from the stored records of typical bicycles, to compare the size and volume specifications of the unoccupied storage compartments against the input dimensional specifications, and to identify an unoccupied bicycle storage compartment that could accommodate the bicycle to be stored based on the comparison.

In other embodiments of the system, the compartment record may store access availability of the storage compartments; and the instructions may be further programmed to cause the processor to provide access to a storage compartment based on the access availability of the storage compartment. In yet another embodiment, the instructions may be further programmed to cause the processor, in response to receiving the storage access request, to identify bicycle storage compartments that are available at the preferred facility location, present a list of bicycle storage compartments that would fulfill the storage access request to a user for selection of a desired storage compartment by the user.

In yet another embodiment, the user booking request may identify a desired storage compartment; and the instructions may further cause a processor, in response to receiving the booking request, to provide access to the desired storage compartment when the desired storage compartment fulfills the storage access request and is not already occupied or already booked by another user. If the desired bicycle is not available for booking, the instructions may cause the processor to identify other suitable compartments (using any of the above-disclosed methods) and to present the other suitable compartments as options to the users.

In another embodiment, there may be a plurality of geographic areas in which one or more storage containers are located; and the request for storage access for a first bicycle may include a desired geographic area. The instructions may further cause the processor to offer the user a bicycle storage compartment that would fulfill the storage access request in a storage compartment in the desired geographic area. In a further embodiment, the desired geographical area may contain more than one bicycle container. The instructions may further cause the processor, in response to receiving the storage access request, to present to the user a list of bicycle containers containing compartments that would fulfill the storage access request to the user for selection of a desired bicycle container.

In the stage 1014, using the load/unload module 812*d* and compartment door opening controls such as controls 114, the compartment platform is rotated until the reserved compartment is positioned at the container door. From compartment records in the storage 875 and using the load/unload module 812*d* and the compartment door opening controls 114, the facility processor 870 determines the door width necessary to provide access to the reserved compartment but provide the adjacent compartments with protection from reach-over, and adjusts the door width to the necessary door width by sliding the sliding door or positioning the compartment shield a selected amount.

Loading

In a stage 1016, using the container keypad 879, the load/unload module 812*d*, and the processor 870, the user is greeted at the facility and is requested to enter a pin. In a stage 1018, using the load/unload app 812*d*, the user is instructed to enter the access pin at keypad 879. In a stage 1020, the user enters the pin at the keypad 879, and, in a stage 1022, using a camera within the container, a photograph is taken of the interior of the reserved compartment before the container door is opened. In a stage 1024, using the load/unload module 812*d*, the processor 870, and the container's door opening controls, the door is unlocked and opened the selected amount sufficient to provide access to the compartment while preventing reach over in to adjacent compartments.

In a stage 1026, the user loads the bicycle plus any desired personal items into the compartment. When the compartment provides wheels-up or wheels-down bicycle storage, the user uses the hoist mechanism, such as hoist mechanism 130 to facilitate placement of the bicycle into the bicycle harness on the mast. In a stage 1028, using the container camera, a photograph is taken of the interior of the reserved compartment shortly after the container door is opened (for example, approximately 10 seconds after door opening).

In a stage 1030, after the user is finished loading the bicycle and his or her personal items, the user closes the door, triggering the door to lock. In a stage 1032, the facility door controls verifies the door is locked, and, in a stage 1034, using the display module 930*d* and a display associated with the keypad 879, the door lock is confirmed to the user. In a stage 1036, using the container camera system 190, another photograph is taken of the interior of the reserved and now loaded compartment. In a stage 1038, using the communication module 940*d* and the I/O module 910*d*, an email is sent over the cloud 850 to the user, confirming the reservation, loading, and locking of the compartment.

Workflow 1100: Unloading a Bicycle from a Compartment

FIG. 11 shows a workflow 1100 for unloading a bicycle from a compartment. In a stage 1112, the user also identifies him or herself and submits a request to unload the bicycle from a container compartment. Using the user booking app 822 or 862, the master booking app 812*c* and the user profile app 812*a*, the user may elect to continue the reservation of the compartment (for example, to continue to use the compartment for storage of certain of the user's personal items), or to end the rental of the compartment once the user removes the bicycle from the compartment. The user's choice is recorded in the user and compartment records in the storage 875.

In a stage 1114, using the master booking app 812*b*, the processor identifies the compartment that has been loaded by the user, and, using the load/unload module 812*d* and the compartment door opening controls, the compartment platform is rotated until the loaded compartment is positioned at the container door. From compartment records in the storage 875 and using the load/unload module 812*d* and the compartment door opening controls, the facility processor 870 may determine the door width necessary to provide access to the reserved compartment but provide the adjacent compartments with protection from reach-over, and may adjust the door width to the necessary door width by sliding the sliding door or positioning the compartment shield a selected amount.

In a stage 1116, using the container keypad 879, the load/unload module 812*d*, and the processor 870, the user is greeted at the facility and requested to enter a pin. In a stage 1118, using the load/unload app 812*d*, the user is instructed to enter the access pin at keypad 879. In a stage 1120, the user enters the pin at the keypad 879, and, in a stage 1122, using a camera within the container, a photograph is taken of the interior of the loaded compartment before the container door is opened. In a stage 1124, using the load/unload module 812*d*, the processor 870, and the container's door opening controls, the door is unlocked and opened the selected amount sufficient to provide access to the compartment while preventing reach over into adjacent compartments.

In a stage 1126, the user unloads the bicycle plus any desired personal items from the compartment. When the compartment provides wheels-up or wheels-down bicycle storage, the user may use the hoist mechanism such as hoist mechanism 130 to facilitate removal of the bicycle from the bicycle harness on the mast. In a stage 1128, using the container camera, a photograph is taken of the interior of the compartment being unloaded shortly after the container door is opened (for example, approximately 10 seconds after door opening).

In a stage 1130, after the user is finished unloading the bicycle and his or her personal items, the user closes the door, triggering the door to lock. In a stage 1132, the facility door controls verifies the door is locked, and, in a stage 1134, using the display module 930*d* and a display associated with the keypad 879, the door lock is confirmed to the user. In a stage 1136, using the container camera, another photograph is taken of the interior of the compartment. In a stage 1138, using the communication module 940*d* and the I/O module 910*d*, an email is sent over the cloud to the user, confirming the unloading of the compartment, the locking of the compartment door, and the user's instructions about continuing the rental of the compartment or the termination of the rental, as elected by the user.

Workflow 1200: Unloading/Loading a User's Bicycle by an Invitee

After a user loads a bicycle into a compartment, the user may choose to make the bicycle available to another person. FIG. 12 shows a workflow 1200 for allowing third party access to a user's bicycle storage compartment, including access to a user's bicycle. The third parties could be coworkers, friends, bike shop employees, and access to the bicycle may be for borrowing or for maintenance, or for any other reason at the option of the user.

In a stage 1202, the user authorizes access by a third party to a loaded compartment. Using the profile module 812*a*, the user may update his or her user profile to identify the third party as an authorized invitee and to identify the earliest and latest times that access is available to the invitee. In a stage 1204, the user may send an invitation to access the loaded compartment to the third party via email. In another embodiment, rather than identifying the invitee to the storage control system, the user may send an electronic token to the invitee (or he may instruct the control system to do so). Using the master booking app 812*c* and the user profile app 812*a*, the user may elect to continue the reservation of the compartment (for example, to continue to use the compartment for storage of certain of the user's personal items or to provide a pre-reserved space to return his bicycle after the borrow or bicycle maintenance is completed), or to end the rental of the compartment once the invitee removes the bicycle from the compartment. The user's choices are recorded in the user and compartment records in the storage 875. The user may have an email sent to the invitee with the facility location, an authorization link to allow for accessing the compartment, and instructions as to the earliest and latest times that access is available to the invitee, a pin code, and instructions to the invitee about what to do with the bicycle when the invitee is finished with the loan of the bicycle.

In a stage 1212, at the facility, using the user booking app 862, the invitee identifies him or herself and submits a request to unload the bicycle from the user's container. The invitee submits the link from the user to the facility at the facility keypad, and, in a stage 1214, using the master booking app 812*b* and the link provided by the invitee, the compartment that has been loaded by the user is identified. Using the load/unload module 812*d* and the compartment door opening controls, the compartment platform is rotated until the loaded compartment is positioned at the container door. From compartment records in the storage 875 and using the load/unload module 812*d* and the compartment door opening controls, the facility processor 870 determines the door width necessary to provide access to the reserved compartment but provide the adjacent compartments with protection from reach-over, and adjusts the door width to the necessary door width by sliding the sliding door or positioning the compartment shield a selected amount.

In a stage 1216, using the container keypad 879, the load/unload module 812*d*, and the processor 870, the invitee is greeted at the facility and requested to enter a pin or provide the token. In a stage 1218, using the load/unload app 812*d*, the invitee is instructed to enter the access pin at keypad 879. In a stage 1220, the invitee enters the pin or submits the token at the keypad 879, and, in a stage 1222, using a camera within the container, a photograph is taken of the interior of the loaded compartment before the container door is opened. In a stage 1224, using the load/unload module 812*d*, the processor 870, and the container's door opening controls, the door is unlocked and opened the selected amount sufficient to provide access to the compartment while preventing reach over into adjacent compartments.

In a stage 1226, the invitee unloads the bicycle plus any desired personal items that the user has authorized the invitee to remove from the compartment. If the user has elected to continue the rental of the compartment, the invitee may leave the user's belongings in the rented compartment. When the compartment provides wheels-up or wheels-down bicycle storage, the invitee uses the hoist mechanism such as hoist mechanism 130 to facilitate removal of the bicycle from the bicycle harness on the mast. In a stage 1228, using the container camera, a photograph is taken of the interior of the compartment being unloaded shortly after the container door is opened (for example, approximately 10 seconds after door opening).

In a stage 1230, after the invitee is finished unloading the bicycle and any of the user's personal items that the invitee is authorized to take, the invitee closes the door, triggering the locking of the door. In a stage 1232, the facility door controls verify that the door is locked, and, in a stage 1234, using the display module 930*d*, and a display associated with the keypad 879, the door lock is confirmed to the invitee. In a stage 1236, using the container camera, another photograph is taken of the interior of the compartment In a stage 1238, using the communication module 940*d* and the I/O module 910*d*, an email is sent over the cloud to the user, confirming the unloading of the bicycle of the compartment and confirming the user's instructions about continuing the rental of the compartment or the termination of the rental, as elected by the user.

Should the user elect for the invitee to return the bicycle to the same compartment or another compartment, the user may have an email sent to the invitee with bicycle return instructions, identifying the desired facility location, an authorization link to allow for accessing the desired compartment, a pin code.

Many features above-described may be included in bicycle storage and access control systems of varying functionality. For example, a bicycle storage facility may be divided into a plurality of compartments, or a series of discrete compartments may be grouped on a lot together to form a motel cottage-style storage facility. A facility may have a stand-alone booking and access system, which is not on-line, or the entire booking and access system may be accessible only on-line. All of the bicycles may be stored in compartments standing upright with the wheels touching the ground, or all may be stored with front wheels up or front wheels down, or a selected combination thereof. Alternating front/rear wheel up configurations may be provided for space optimization.

Reach-over protection may be available in adjacent compartments, using partial or complete walls made of solid material fencing, or netting, thus obviating the need to lock bicycles in a compartment.

Bicycle storage facilities may be provided in a variety of locations where bicycle use may be preferred and promoted, and for a variety of reasons. Use cases include but are not limited to dense city locations, company/government offices, apartment/condo buildings, hotels (for guests' bikes or for rental bikes), restaurants for valet bike parking, train/subway stations, suburban offices and related and relatively close by train/subway stations, park & cycle locations at bike highways into city centers. Bicycle storage facilities may be provided with roofs to protect stored bicycles from the elements. In addition, the exterior surfaces of a facility may be used as a surface for advertising via printed panels or live screens.

Defined user groups may be provided with access to compartments in defined facilities; for example, a company's employees may be provided with access to a facility in an office park or a service provider (e.g. bike shop) may store loaner bikes or bikes during winter in secure compartments, or could make secure compartments available to bicyclists for drop-off of bikes to be repaired or for pick-up of repaired bicycles. In addition, a bicycle rental operation may provide its rental bicycles in secure compartments, with access available to renters or their authorized invitees.

In addition, although the disclosed components have been described above as being separate units, one of ordinary skill in the art will recognize that functionalities provided by one or more units may be combined. As one of ordinary skill in the art will appreciate, one or more units may be optional and may be omitted from implementations in certain embodiments. For example, in one configuration, the bicycle storage and access control system may be developed to be standalone, not online, with all transactions stored locally and with bicycles stored front wheel up in individual capsules in a facility, with compartments equipped with e-charger, having reach over prevention between adjacent compartments, and having personal item storage available in the compartments. Each compartment may be assigned a unique RFID card, and a user may access a capsule via an RFID card plus entry of a password pin on a keypad near to a door that provides access to the capsule.

In another configuration, the bicycle storage and access control system may be cloud-based, with a user obtaining access to a compartment via an app plus entry of a pin to load/unload a bicycle. A user profile contains data related to preferences, including bicycle dimensional specifications and payment preferences; and video surveillance, particularly at loading/unloading point, provides a facility with additional security.

The foregoing descriptions have been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. It is intended that the specification and examples be considered as exemplary only, with a true scope and spirit of the invention being indicated by the following claims.

The invention claimed is:

1. A bicycle storage container comprising:
a container floor;
a container wall extending upwardly from the container floor;
a chamber defined by the container floor and the container wall, the chamber having
a turntable positioned on the container floor, the turntable having a rotatable platform on a base that extends from the container floor;
a mast extending upwardly from the turntable, and
a plurality of storage compartments spaced radially around the mast,
wherein the storage compartments are sized for receiving a bicycle loaded therein by a user through associated compartment openings and for housing the bicycle, and are defined by sidewalls extending radially from the mast toward the container wall, and
wherein the storage compartments have:
a plurality of compartment openings associated with their respective storage compartments, the compartment openings extending across their respective storage compartments at or near the container wall, and
a plurality of known compartment specifications associated with their respective storage compartments, the known compartment specifications further relating to compartment volume or compartment size of their respective storage compartments,
with a first compartment in the storage compartments having a first compartment opening and known first compartment specifications; and
with a second compartment in the storage compartments having known second compartment specifications that are different from the known first compartment specifications; and
a door assembly attached to the container wall, the door assembly having a door with a door opening associated therewith,
wherein the door opening is adjustable to provide a plurality of door opening widths that are sized to allow access through the plurality of compartment openings associated with the storage compartments, and
wherein the door opening is arranged to allow access to the first compartment, with the access extending through the first compartment opening when the turntable is rotated to align the door with the first compartment, and
wherein, when the door is aligned with the first compartment, the door assembly is arranged to provide the door opening with a first door opening width that is based on the known first compartment specifications, the door opening adjusted to the first door opening width being sized to be:
sufficiently wide to provide, to the user, bicycle access into and out of the first compartment through the door opening and the first compartment opening, and
sufficiently narrow to limit or prevent access by the user to compartments adjacent to the first compartment.

2. The bicycle storage container of claim 1,
wherein the bicycle storage container further comprises a vertical axis extending through the center of the turntable, and
wherein the mast is disposed a selected distance from and parallel to the vertical axis.

3. The bicycle storage container of claim 1, wherein the door assembly has a compartment shield that extends along at least a portion of a vertical side of the door and has an adjustable shield width for adjustably covering at least a portion of the door opening, with the compartment shield reducing at least a portion of the door opening a selected amount based on the known first compartment specifications.

4. The bicycle storage container of claim 1, further comprising a computer system having:
a processor and a memory containing records associated with the plurality of storage compartments; and a non-transitory computer-readable medium encoding instructions for computer-based accessing of the storage compartments and for execution by the processor, the instructions programmed to cause the processor to receive, into the memory, a request for access to bicycle storage; and in response to receiving the request to access the bicycle storage, provide access to a selected compartment based on dimensional specifications of the bicycle and known selected compartment specifications of the selected-compartment.

5. The bicycle storage container of claim 1,
wherein the first compartment is sized to store a first bicycle of a first size,
wherein the second compartment is sized to store a second bicycle of a second size; and
wherein the first size is different than the second size.

6. The bicycle storage container of claim 1, wherein the first compartment is sized to store a plurality of bicycles.

7. The bicycle storage container of claim 6,
wherein the first compartment is sized to store a first number of bicycles,
wherein the second compartment is sized to store a second number of bicycles, and
wherein the first number is different from the second number.

8. The bicycle storage container of claim 1, wherein the first compartment has hanging components for rear wheel up storage of the bicycle.

9. The bicycle storage container of claim 8, wherein the second compartment has hanging components for front wheel up storage of the bicycle.

10. The bicycle storage container of claim 1, wherein the first compartment has hanging components for front wheel up storage of the bicycle.

11. The bicycle storage container of claim 1,
wherein the compartment specifications have a plurality of known compartment volumes associated with their respective storage compartments,
with a known first compartment volume associated with the first compartment, and
with a known second compartment volume associated with the second compartment, the known second compartment volume being different from the known first compartment volume, and
wherein the first door opening width is based on the known first compartment volume.

12. The bicycle storage container of claim 1,
wherein the first compartment has a hanging component for storage of the bicycle; and
wherein the bicycle storage container has a pneumatically driven bicycle lift arranged to lift the bicycle into engagement with the hanging component.

13. The bicycle storage container of claim 1,
wherein the compartment specifications have a plurality of known compartment opening widths relating to their respective storage compartments,
with a known first compartment opening width associated with the first compartment, and
with a known second compartment opening width associated with the second compartment, the known second compartment opening width being different from the known first compartment opening width; and
wherein the first door opening width is based on the known first compartment opening width.

14. The bicycle storage container of claim 1,
wherein the container wall is formed with a first number of sides,
wherein the chamber has a second number of storage compartments, and
wherein the first number of sidewalls is different from the second number of storage compartments.

15. The bicycle storage container of claim 1, wherein the door is curved convexly relative to a center of the bicycle storage container and extending beyond the container wall.

16. The bicycle storage container of claim 1,
wherein the container floor has a width, and
further comprising a compartment space encompassing the plurality of storage compartments,
wherein a boundary of the compartment space has a cross-section that is co-planar with the container floor,
wherein the compartment space cross-section has a diameter that is longer than the container floor width, and
wherein the convex door is sized to accommodate the compartment space.

17. The bicycle storage container of claim 1, wherein the door is planar.

18. The bicycle storage container of claim 1, wherein the first compartment and another compartment share a common sidewall.

19. The bicycle storage container of claim 1, wherein at least a portion of the container wall comprises fencing.

20. A method comprising:
spacing a plurality of storage compartments in a bicycle storage container having a container wall and a container floor;
sizing the storage compartments for receiving a bicycle loaded therein by a user through associated compartment openings and for housing a bicycle,
spacing the storage compartments radially on a platform around a mast extending upwardly from a rotatable turntable positioned on the container floor,
wherein the storage compartments have a plurality of known compartment specifications associated with their respective storage compartments, the known compartment specifications further relating to compartment volume or compartment size,
with a first compartment in the storage compartments having known first compartment specifications, and
with the second compartment in the storage compartments having known second compartment specifications that are different from the known first compartment specifications;
separating the first compartment from adjacent storage compartments with sidewalls extending radially from the mast toward a container wall;
extending a plurality of compartment openings across their respective storage compartments at or near the container wall;
computer-based rotating of the platform to align the first compartment with a door in a door assembly attached to the container wall, wherein the door has a door opening associated therewith;
computer-based adjusting of the door opening to provide a plurality of door opening widths that are sized to allow access through the plurality of compartment openings associated with the storage compartments; and
when the door is aligned with the first compartment, computer-based selecting of a first door opening width for the door opening based on the known first compartment specifications associated with the first compartment, the door opening adjusted to the first door opening width sized to accommodate the user accessing the first compartment while limiting or preventing access to storage compartments adjacent to the first compartment; and computer-based opening of said door assembly to the first door opening width to allow bicycle access into and out of the first compartment through the door opening and the first compartment opening.

21. The method of claim 20,
wherein the bicycle storage container further comprises a vertical axis extending through the center of the turntable, and
further comprising disposing the mast a selected distance from and parallel to the vertical axis.

22. The method of claim 20,
wherein the bicycle storage container has a width, and
further comprising a compartment space encompassing the plurality of bicycle storage compartments, the compartment space having a boundary with a cross-section that is co-planar with the container floor,
wherein a diameter of the compartment space boundary is longer than the container width, and
further comprising sizing the door in the container wall and curving the door convexly from the container wall to accommodate the compartment space.

23. A system comprising:
a bicycle storage container having
  a container floor;
  a container wall extending upwardly from the container floor;
  a chamber defined by the container floor and the container wall, the chamber with:
    a turntable positioned on the container floor, the turntable with a rotatable platform on a base that extends from the container floor;
    a mast extending upwardly from the turntable, and
    a plurality of storage compartments spaced radially around the mast,
      wherein the storage compartments are sized for receiving a bicycle loaded therein by a user through associated compartment openings and for housing the bicycle and are defined by sidewalls extending radially from the mast toward the container wall, and
      wherein the storage compartments have:
        a plurality of compartment openings associated with their respective storage compartments, the compartment openings extending across their respective storage compartments at or near the container wall, and
        a plurality of known compartment specifications associated with their respective storage compartments, the known compartment specifications further relating to compartment volume or compartment size of their respective storage compartments,
        with a first compartment in the storage compartments having a first compartment opening and known first compartment specifications; and
        with a second compartment in the storage compartments having known second compartment specifications that are different from the known first compartment specifications; and
  a door assembly attached to the container wall, the door assembly having a door with a door opening associated therewith
    wherein the door opening is adjustable to provide a plurality of door opening widths that are sized to allow access through the plurality of compartment openings associated with the storage compartments, and
    wherein the door opening is arranged to allow access to the first compartment, with the access extending through the first compartment opening when the turntable is rotated to align the door with the first compartment, and
    wherein, when the door is aligned with the first compartment, the door assembly is arranged to provide the door opening with a first door opening width that is based on the known first compartment specifications, the door opening adjusted to the first door opening width being sized to be:
      sufficiently wide to provide, to the user, bicycle access into and out of the first compartment through the door opening and the first compartment opening, and
      sufficiently narrow to limit or prevent access by the user to compartments adjacent to the first compartment; and
a computer system with
  a processor;
  a memory containing records associated with the plurality of storage compartments; and
  a non-transitory computer-readable medium encoding instructions for computer-based accessing of the storage compartments and for execution by the processor, the instructions programmed to cause the processor to receive, into the memory, a request for access to bicycle storage; and
  in response to receiving the storage access request, provide access into and out of the first compartment by:
    computer-based rotation of the platform to align the first compartment with the door in the door assembly;
    computer-based adjustment of a door opening associated with the door to provide a plurality of door opening widths that are sized to allow access through the plurality of compartment openings associated with the storage compartments;
    when the door is aligned with the first compartment, computer-based selection of a first door opening width based on the known first compartment specifications associated with the first compartment, the first door opening width sized to accommodate the user accessing the first compartment while limiting or preventing access to storage compartments adjacent to the first compartment; and
    computer-based opening of said door the first door opening width to allow bicycle access into and out of the first compartment through the door opening and the first compartment opening.

24. The system of claim 23,
wherein the known compartment specifications have a plurality of known compartment volumes associated with their respective storage compartments,
  with a known first compartment volume associated with the first compartment, and with a known second compartment volume associated with the second compartment, the known second compartment volume being different from the known first compartment volume;

wherein a record associated with the first compartment further stores volume data associated with the known first compartment volume; and wherein the instructions for computer-based accessing of the storage compartments comprise further instructions programmed to cause the processor to, in response to receiving the request to access the bicycle storage, select the first compartment based on dimensional specifications of the bicycle and the known first compartment volume of the first compartment.

25. The system of claim 23, wherein the known compartment specifications have a plurality of known compartment opening widths associated with their respective storage compartments, with a known first compartment width associated with the first compartment, and with a known second compartment width associated with the second compartment, the known second compartment width being different from the known first compartment width;

wherein a record associated with the first compartment further stores compartment opening width data associated with the known first compartment opening width; and wherein among the plurality of bicyclo storage compartments is one storage compartment with a widest compartment opening and another storage compartment with a narrowest compartment opening; and wherein the instructions for computer-based accessing of the storage compartments comprise further instructions programmed to cause the processor to, in response to receiving the request to access the bicycle storage, select the first compartment based on dimensional specifications of the bicycle and the known first compartment volume of the first compartment, with the first door opening width being at least sufficiently wide to accommodate the widest compartment opening and at least sufficiently narrow to accommodate the narrowest compartment opening.

26. The system of claim 23, wherein the door assembly further comprises a compartment shield that extends along at least a portion of a vertical side of the door and has an adjustable shield width for adjustably covering at least a portion of the door opening, with the compartment shield reducing at least a portion of the door opening a selected amount based on the known first compartment specifications.

27. The system of claim 25, wherein the door further comprises a sliding door that is slidable to change the door opening from having a widest door opening width through the plurality of door opening widths to a narrowest door opening width, with the door opening widths accommodating the compartment opening widths of the plurality of storage compartments.

* * * * *